(12) United States Patent
Pendleton et al.

(10) Patent No.: US 8,016,653 B2
(45) Date of Patent: Sep. 13, 2011

(54) THREE DIMENSIONAL VIRTUAL RENDERING OF A LIVE EVENT

(75) Inventors: Rand Pendleton, Santa Cruz, CA (US);
Kenneth A. Milnes, Fremont, CA (US);
Marvin S. White, San Carlos, CA (US)

(73) Assignee: Sportvision, Inc., Chicago, IL (US)

( * ) Notice: Subject to any disclaimer, the term of this patent is extended or adjusted under 35 U.S.C. 154(b) by 945 days.

(21) Appl. No.: 11/670,394

(22) Filed: Feb. 1, 2007

(65) Prior Publication Data
US 2008/0186330 A1    Aug. 7, 2008

(51) Int. Cl.
*A63F 13/00* (2006.01)
(52) U.S. Cl. .................................. 463/6; 463/31; 463/42
(58) Field of Classification Search ................ 463/6, 30, 463/31, 32, 40, 41, 42
See application file for complete search history.

(56) References Cited

U.S. PATENT DOCUMENTS

| | | | | |
|---|---|---|---|---|
| 6,010,403 | A * | 1/2000 | Adam et al. ....................... | 463/6 |
| 6,020,851 | A | 2/2000 | Busack | |
| 6,664,923 | B1 | 12/2003 | Ford | |
| 6,718,259 | B1 | 4/2004 | Khosla | |
| 6,726,567 | B1 * | 4/2004 | Khosla ............................. | 463/42 |
| 6,728,637 | B2 | 4/2004 | Ford et al. | |
| 6,744,403 | B2 | 6/2004 | Milnes et al. | |
| 7,046,125 | B2 * | 5/2006 | Fugit .......................... | 340/323 R |
| 7,211,000 | B2 * | 5/2007 | Jutzi et al. ........................ | 463/40 |
| 7,657,920 | B2 * | 2/2010 | Arseneau et al. ............. | 725/133 |
| 2002/0057217 | A1 | 5/2002 | Milnes et al. | |
| 2003/0216865 | A1 * | 11/2003 | Riewe et al. .................. | 701/220 |
| 2005/0044575 | A1 * | 2/2005 | Der Kuyl ....................... | 725/100 |
| 2006/0047423 | A1 * | 3/2006 | Min ............................. | 701/209 |

FOREIGN PATENT DOCUMENTS

| | | |
|---|---|---|
| WO | 0067867 A | 11/2000 |
| WO | 0230119 A | 4/2002 |

OTHER PUBLICATIONS

Takayoshi Koyama, Live Mixed-Reality 3D Video in Soccer Stadium, Proceedings of the Second IEEE and ACM International Symposium on Mixed and Augmented Reality,Oct. 7, 2003, pp. 178-187, ACM, Piscataway, NJ, USA.
Tao Zhao, Tracking Multiple Humans in Crowded Environment, Proceedings of the 2004 IEEE Computer Society Conference on Computer Vision and Pattern Recognition, Jun. 2004, pp. 406-413, vol. 2, Piscataway, NJ, USA.
International Search Report and Written Opinion dated Oct. 20, 2008 in PCT Application No. PCT/US2008/052686.

* cited by examiner

*Primary Examiner* — James S McClellan
(74) *Attorney, Agent, or Firm* — Vierra Magen Marcus & DeNiro LLP

(57) ABSTRACT

A method is disclosed for three-dimensional rendering of a live event such as an automobile race over a client device such as a personal computer. Moving and stationary objects at the event may be rendered using computer-generated graphics of the moving and stationary objects and real time positional data giving the position of the moving objects over time. The positional data may be streamed to the client device and displayed in real time or substantially real time.

16 Claims, 11 Drawing Sheets

THREE DIMENSIONAL VIRTUAL RENDERING OF A LIVE EVENT

BACKGROUND OF THE INVENTION

1. Field of the Invention

The present invention is directed to a three dimensional system for virtual rendering of a live event.

2. Description of the Related Art

Sporting events have traditionally been broadcast in video captured by cameras at various positions around the event. Typically, several cameras will capture video of a sporting event at the same time, and the video signals are then transmitted to a production center, where a production director decides which video signal to broadcast at a given time. Sports such as auto racing have a large track with action taking place at several locations around the track. Given the size of the track and the fact that cameras generally zoom in to provide detail of the action, each camera captures only a small portion of the event at a given time. While bird's eye views taking in the entire race are possible, such views provide very little discernable detail.

The result is that while there may be several different areas of interest to viewers around the track, the production director must pick one or two (split screen) views for broadcast at a given time. Fans receiving the broadcast have no options but to watch the particular cars or views selected for broadcast. Worse still, fans unable to receive the broadcast are generally unable to view the race in real time. Some websites are available which offer updates on race progress, but there is no widely available mechanism for viewing a race in real time apart from the actual broadcast.

Video games exist, for example for auto racing, which allow users to select the virtual viewing perspective of what is displayed to them over their computer screen. For example, the line of NASCAR® video games from EA Sports® allows users to select different views and change perspectives during a race. Although these video games include displays of actual racetracks, the races themselves are simulated and are not representations of actual races. The positions of the cars displayed during the race are determined by a processor according to an algorithm and in response to player input.

In 2005, in association with the yacht race "Volvo Ocean Race 2005-2006," a software application program called Virtual Spectator was made available on the race's website—www.volvooceanrace.org. Using actual GPS and other race data, the application program provided a virtual display of the race showing nearly real time positions of the yachts during the race. Users of the application program can choose bird's eye views of the race, or can choose a view from the deck of a selected yacht.

While based on actual positioning data, the positions of the yachts displayed in the Virtual Spectator application program are merely estimates. It is well known that GPS data contains errors, and that GPS data can be lost for stretches of time. However the Virtual Spectator race viewer did not solve or address these problems, because any positioning error of the displayed yachts was inconsequential relative to the scale of the race. The race was literally global, and at points yachts could be separated on the open ocean by miles. Thus, rough estimates of the positions of the yachts at a given time were all that was provided by the application program. This is evident when using Virtual Spectator to view the race from the virtual deck of one of the yachts. When the yachts are close together, for example at the start of the race, the yachts blend into and through each other on the display.

Before an acceptable virtual rendering of a live sporting event such as auto racing can be provided, the problem of positioning error needed to be solved. In an auto race, the cars may be literally inches from each other, and are moving at high speeds and rapidly changing speeds. It is desirable to provide a system where the virtual cars may be displayed using actual positional data, but where the cars are not displayed blending into the track, and are only shown overlapping with the side wall or each other upon an actual crash.

SUMMARY OF THE INVENTION

The present invention, roughly described, relates to a method of three-dimensional rendering of a live event over a client device such as a personal computer. Moving and stationary objects at the event may be rendered using computer-generated graphics of the moving and stationary objects and real time positional data giving the position of the moving objects over time. The positional data may be streamed to the client device in real time or substantially real time, such as up to a five second delay. The positional data may also be streamed to the client device substantially delayed from real time, such as a day, week, or years later.

In embodiments, the event may be an automobile race. A user may download an applet, which then controls the further download of computer-generated graphics to the client device of the sky, the track where the race is being held, and of each of the cars in the race. The computer-generated graphics for each of the objects may include wireframe data comprised of a plurality of polygons which together represent a topography of the object, and texture mapping data applied over the wireframe to give a realistic appearance to each of the objects.

Data relating to the position and attitude of each of the cars may be measured by a data acquisition and positioning system ("DAPS") provided in each of the cars. Each DAPS is capable of measuring car position using, for example, GPS or other satellite based navigation system, and an inertia measurement unit. Velocity, acceleration and jerk may be computed from a sequence of position measurements. A digital model of the race track surface may be used to determine the car's attitude given the measured position and computed velocity vector. An inertial measurement unit can also be used to measure the car's attitude. Predictions in the precision of the measured data may also be returned in the form of a standard deviation of the data.

Data obtained for a given time period for each car is relayed to a central computer. The central computer uses various computer-implemented processes to generate a best estimate of the position and attitude for each of the cars at a given time. Using these computer-implemented processes over all time periods generates streaming data of the best estimate of position and attitude data for each of the cars. In embodiments, one of the computer-implemented processes involves a first filtering process on the data referred to herein as a state estimation process, which may be performed for example by a Kalman filter. In the state estimation process, the data and standard deviations from various sources are used to determine a blended estimate of the best position and attitude data for each car at each measured time period. In embodiments, another computer-implemented process involves a second filtering process on the data, referred to herein as an overlap correction process. The overlap correction process is an iterative process where the position of each car is checked for overlap with other cars, the track wall and the track surface. Where such overlap is found (which is not due to an actual crash), the position data for the affected car or cars is corrected to arrive at a final position and attitude for each car.

The computer-generated graphics data may be downloaded to a client device once upon downloading the applet. During the race, the corrected data for the position and attitude of each car may be streamed to the client device. A user is given options for selecting a desired field of view (which would be the camera angle and field of view in a video broadcast). Using the selected field of view, graphics data and streaming positional data, the present invention renders a three-dimensional display of the race over the client device from the user-defined perspective.

DETAILED DESCRIPTION

The present invention will now be described with reference to FIGS. 1-12, which in embodiments pertains to a system for three dimensional virtual rendering of an event using positional data of real objects. For purposes of example and illustration only, the following discussion describes a system used in conjunction with an automobile race, such as for example a NASCAR, Indy Car or other motor sport sanctioning body race. However, the present invention can be used to render moving objects other than cars and can be used in conjunction with events other than auto race events, including both sporting and non-sporting events.

Figure 1:
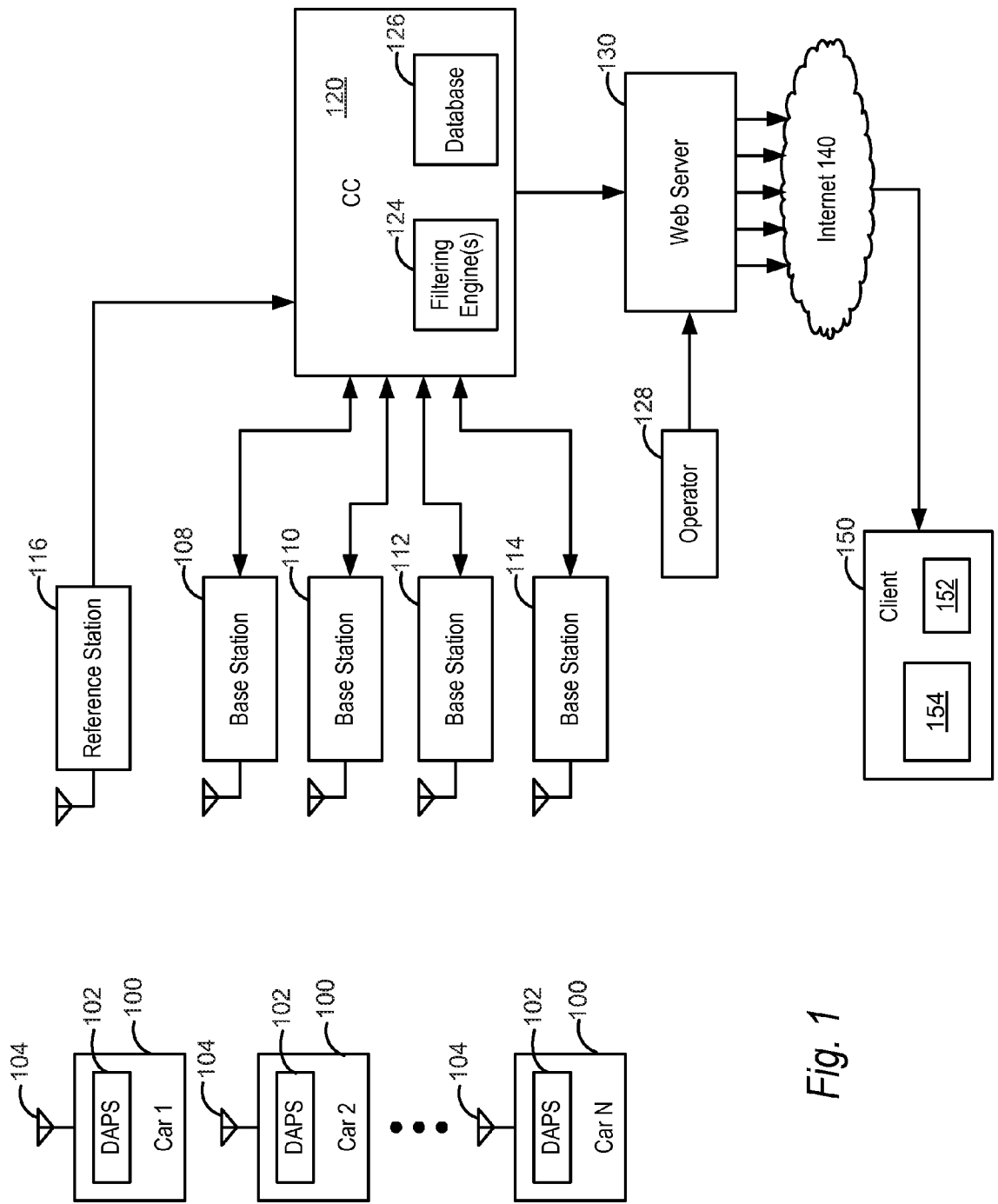
FIG. 1 is a block diagram showing components of the system according to the present invention.

FIG. 1 is a block diagram of an embodiment of the present invention used with auto racing. FIG. 1 shows a plurality of cars 100 (Car 1, Car 2, . . . , Car N) that are participating in the race. Each car 100 includes a data acquisition and positioning system (DAPS) 102 and an antenna 104 for communicating with various base stations (e.g., 106, 108, 110 and 112) as explained hereinafter.

Details regarding the DAPS units 102 are provided in U.S. Pat. No. 6,744,403, entitled, "GPS Based Tracking System," which patent is assigned to the owner of the present invention and which patent is incorporated by reference herein in its entirety (hereinafter "the '403 patent"). In general, each DAPS unit 102 measures various parameters regarding the car in which it is mounted, and relays that information to the base stations.

In embodiments, the position of each DAPS unit 102 and by association, the car within which it is mounted, is determined by the Global Positioning System (GPS). GPS is a satellite based navigation system operated and maintained by the U.S. Department of Defense. GPS consists of a constellation of GPS satellites providing worldwide, 24 hour, three dimensional navigational services. Each DAPS unit 102 includes a GPS receiver and antenna. The receiver may for example be a NovAtel OEM4 receiver made by NovAtel Inc. of Calgary, Canada. The GPS receiver measures distance using the travel time of radio signals. To measure travel time of a GPS signal from the satellite to a receiver, the receiver will generate the same pseudo-random code as the satellite and compare the generated code with the received code to determine the shift between the two codes. The travel time is multiplied by the speed of light to determine the distance between the satellite and the receiver. By computing the distance to four of the GPS satellites orbiting the earth, a GPS receiver can calculate an accurate position and measurement time of itself. The position being tracked is an x, y, z position of the antenna of the GPS receiver in ECEF (Earth-Centered, Earth-Fixed) Cartesian coordinates. The ECEF coordinates are converted to latitude, longitude and altitude. Latitude and longitude are converted to state plane coordinates. Further details of the GPS including the GPS receiver and antenna are provided in the '403 patent, previously incorporated by reference.

While GPS is one method of determining the position of each car, it is understood that other known methods exist for determining the x, y, z position of each of the cars. For example, global navigation systems using European Union satellites, referred to as the Galileo positioning system, or Russian satellites, referred to as GLONASS, may be used. Various other systems, using radio frequency, optical tracking, or other techniques, may also be used to determine the position of the cars during a race.

There are a number of errors that are associated with known satellite navigation positioning systems, including errors due to the Earth's ionosphere and atmosphere, noise, radio frequency propagation multipath, and ephemeris errors. Additionally, basic geometry itself can magnify the errors based on the configuration of the satellites in the sky. The dilution of precision, a measure of geometric error, and position standard deviation are descriptions of the uncertainty of particular GPS data. At times position information is not available due to signal blockage.

One enhancement to standard GPS technology includes the techniques of differential GPS, which involves a reference GPS receiver that is stationary and has its position accurately surveyed. In embodiments of the present invention measuring position by GPS, reference station 116 of FIG. 1 may be provided for this purpose. Satellite signals have errors which have a high spatial and temporal correlation. Therefore, if two receivers are fairly close to each other, the signals that reach both of them will have traveled through virtually the same slice of atmosphere, and will have virtually the same errors. With differential GPS, the stationary reference receiver is used to measure errors. The reference receiver then provides error correction information to the other receivers (e.g. roving receivers). This way, systemic errors can be reduced.

Carrier Phase Realtime Kinematic, differential GPS can be accurate to within a few centimeters. However, under certain conditions, such as for example where there is not a clear line of sight to at least four satellites simultaneously, the accuracy of the position reported by GPS degrades substantially, or may not be available at all.

In embodiments, in addition to GPS measurements, each DAPS unit 102 may include an inertia measurement unit (IMU) capable of measuring acceleration and rate of change in attitude (i.e., pitch, roll and yaw rates). In embodiments, the IMU may include a combination of accelerometers and angular rate sensors (gyroscopes) to track how a DAPS unit is moving and where it is. In general, an IMU can determine position and velocity by measuring the current acceleration and rate of change in attitude of a DAPS unit 102, and then summing the measured values over all time periods to find the total change from a known initial position.

In embodiments, the IMU would be used in combination with the GPS to provide the accuracy of GPS and the continuity of IMU where GPS data may be unavailable. A Kalman filter may be employed by a processor of each DAPS unit 102 to optimize the measured values received from the GPS and IMU. Greater details relating to such a Kalman filter are disclosed in the previously incorporated '403 patent as well as U.S. Pat. No. 6,664,923 entitled "Position And Velocity Kalman Filter For Use With Global Navigation Satelite System Receivers" to Thomas Ford, which patent is incorporated herein in its entirety. The use of a Kalman filter in association with another aspect of the present invention is also explained hereinafter. In embodiments, the GPS receiver may be connected to the IMU with an SDLC, RS-232 or RS-422 serial link. Data from the GPS and IMU may then be transferred from the DAPS to a base station 106, 108, 110 or 112. In alternative embodiments, it is contemplated that a DAPS unit 102 include only one of a GPS or an IMU.

The IMU may include three accelerometers and three gyroscopes housed within an enclosure. The accelerometers may be positioned such that their measuring axes are orthogonal to each other to be able to measure linear acceleration in three orthogonal directions, x, y and z (z being the acceleration due at least in part to gravity). The three gyroscopes may also be positioned within the enclosure such that their measuring axes are orthogonal to each other, measuring changes in the rotation rates. The enclosure may be formed of a material known to minimize electromagnetic interference.

The IMU may further include firmware for calculating acceleration, velocity and attitude from the measured forces and rotations. The output rate for this data may be for example at 100 Hz. A communications link may be provided for data transfer to and from the IMU.

As indicated, the IMU measures changes in orientation and acceleration, and is thus provided with the initial position, velocity, attitude, Earth rotation rate and gravity field. Once these parameters are known, the IMU is capable of providing acceleration, velocity and attitude with no external inputs. Errors in the IMU sensor measurements may accumulate over time, and an inertial-only solution may degrade with time. External updates such as GPS position, velocity or attitude may be supplied to the IMU to minimize this error. The IMU may further include a power supply for powering the GPS receiver and IMU. A suitable GPS receiver and IMU for use in DAPS unit 102 is available from NovAtel Inc. of Calgary, Canada.

In addition to the GPS and IMU systems, DAPS unit 102 may include a variety of other components, such as a wireless modem and a processor, and may include a variety of other sensors for sensing data about the automobile. For example, the system could include a brake sensor for determining the position of the brake pedal, an RPM sensor for determining the instantaneous RPM, a throttle sensor for determining the position of the throttle, gear sensors for determining the position of the transmission, temperature sensors, fuel level sensors, transmission position sensors, sensors for determining information about the driver, etc. Some of these sensors are digital sensors and some of these sensors are analog sensors.

The DAPS unit 102 may be mounted within a car in a calibrated position (a known position relative to the dimensions of the car). During a race, using GPS and the IMU, a DAPS unit 102 may transmit data to one or more of the base stations 106, 108, 110 or 112. Using this information, velocity, acceleration and jerk may be computed from a sequence of position measurements. A digital model of the race track surface may be used to determine the car's attitude given the measured position and computed velocity vector. The IMU may be used to determine the attitude of the car. The Kalman filter within the DAPS unit 102 also generates a standard deviation for the data in a known manner, which is an indication of the confidence level of the data.

It is understood that the components of the DAPS units 102 may vary in alternative embodiments. In one embodiment for example, a DAPS unit 102 may utilize an Ampro 486DX CPU having an Intel 486 processor, a NovAtel OEM4 GPS unit, and a Utilicom LR2020 telemetry system. In an alternative embodiment, a DAPS unit 102 may utilize a PI Research 5200 CPU having a PowerPC 5200 processor, a NovAtel OEMV GPS unit, and a Afar AR 24027 telemetry system. It is understood that DAPS units 102 may utilize other CPUs, processors, GPS units, and telemetry systems in alternative embodiments.

Data generated within DAPS units 102 are relayed to the base stations 106-112 via antenna 104 on each car. In embodiments, antenna 104 may be a 900 MHz antenna. In one embodiment, the system includes up to five base stations, each of which may also include a 900 MHz antenna. In another embodiment, each base station may include a 2.4 GHz antenna and up to 8 base stations. There can be more or less than five base stations in alternative embodiments. It is contemplated that base stations will be located at different parts of the racetrack (or other event). Data from each of the base stations is communicated to a central computer (CC) 120, explained hereinafter, using DSL modems, Ethernet, or the like.

In order to aid in the determination and correction of the three-dimensional position of moving objects such as cars during an auto race, a geometric model of the event location is created before the event, and stored in a computer memory, for example within CC 120. For an auto race, the geometric track model may be provided to constrain a GPS derived position of the cars on the track. In one implementation, a track model is a set of two or more planar surfaces which approximate the (contiguous or non-contiguous) surface (or surfaces) on which the navigation takes place (or near where navigation takes place). A track model can model many different types of surfaces, and is not confined to only model a racetrack. In one embodiment, each planar surface is defined by three vertex coordinates defining a triangle. Other shapes can also be used. In one implementation, the constraint provided by the track model is that while the antenna is "within" the triangle, the position of the antenna is constant in the direction normal to the planar section. Based on a fixed antenna height, a planar constraint can be defined with respect to the local planar section.

Figure 2:
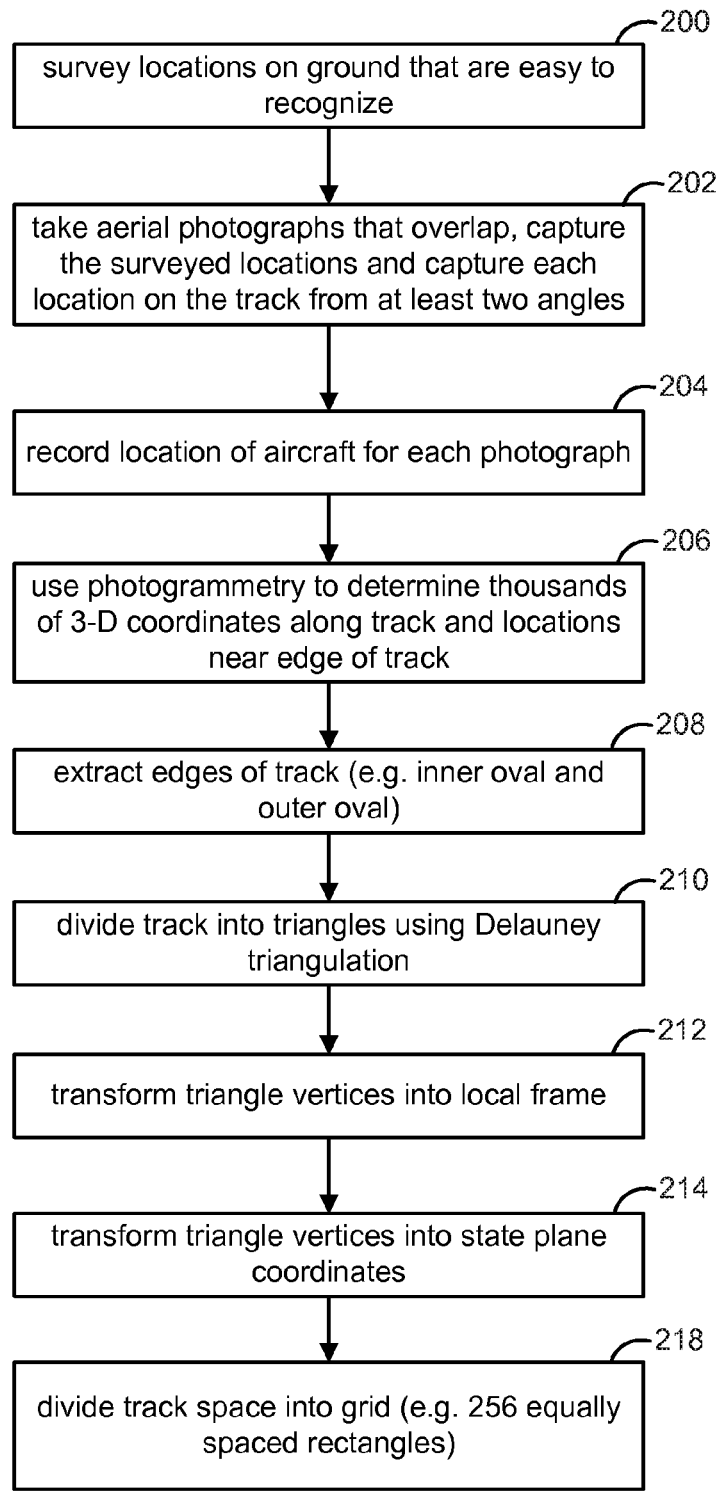
FIG. 2 is a flowchart of the steps for determining a geometric model of the track and surrounding models.

Further details relating to generating and using a geometric track model are disclosed in the above-incorporated '403 patent, as well as U.S. Pat. No. 6,728,637, entitled "Track Model Constraint for GPS Position," which patent is assigned to the owner of the present invention, and which patent is incorporated by reference herein in its entirety. FIG. 2 shows a flowchart describing a process for creating a geometric track model. In step 200, various locations on the ground at or near the racetrack (or other surface) that are easy to recognize are accurately surveyed. In step 202, aerial photographs are taken of the racetrack (or other surface). The photographs may be taken from an aircraft approximately 300 meters above the track surface and the photographs overlap so that they capture each location on the racetrack and each of the surveyed locations from at least two angles. The location of the aircraft is recorded for each photograph (step 204).

In step 206, photogrammetry may be used to determine thousands of three dimensional coordinates along the track surface and locations near the edge of the track. In step 208, the edges of the track surface are extracted. In some cases, the edges of the track surface include one or more inner ovals (or other shapes) and an outer oval (or other shape) which represent the boundaries of the track. In step 210, the track surface is divided into a set of two or more sub-surfaces. In one embodiment, the sub-surfaces are polygons (or other shapes). In one implementation, step 210 includes dividing the track into triangles using for example Delauney triangulation. In step 212, the triangles are transformed from the geographic frame to the local frame. In step 214, the triangles are transformed to the state plane coordinates. In step 218, the entire track model space is divided into a grid. In one embodiment, the grid includes 256 equally sized rectangles in the local frame.

In one implementation, the process of FIG. 2 is performed prior to a race (or other event). After the process of FIG. 2 is completed, the geometric track model is available to the GPS receiver for use in determining the position of the GPS antenna.

In an automobile race embodiment, the data acquired from the DAPS units 102 and the data for the track model are used to determine a three dimensional position of the cars, track, stands and other objects associated with the race. With respect to the position of the cars in particular, the data acquired from the DAPS units 102 and the track model data produce a three-dimensional position, as well as derived vector determinations of the speed, acceleration, jerk and attitude (pitch, roll and yaw) of each of the cars, for each measurement time period. The DAPS units 102 may also produce a standard deviation as to the accuracy of each of these measured parameters, for each car, and for each measurement time period. The standard deviation is in effect a confidence level in the positional data at the time the positional data is obtained. The positional and other data may be measured and returned from the DAPS units 102 several times a second, for example 5 times per second. It is understood that the data may be returned more or less times each second in alternative embodiments. Further details for generating position, speed, acceleration, jerk and attitude data for the cars, and a standard deviation for that data, are explained in greater detail in the previously-incorporated '403 patent.

The data from the DAPS unit 102 can also be used to determine which car is leading the race, in second place, third place, etc., amount of time behind the leader, lap number, lap fraction, instantaneous velocity, RPM, throttle position, brake position, drafting effect, transmission gear engaged, fuel level, a prediction of when the car's fuel will be depleted, when the car has crossed certain locations on the track, when an accident is occurring and a car's position with respect to other cars which may have already raced.

CC 120 may be a computing device of known design such as for example a personal computer including a processor, memory and input/output devices such as a keyboard and a pointing device. CC 120 may receive the data from the base stations 106-112, process the data, and forward data to a web server 130, as explained hereinafter.

In embodiments, the CC 120 receives data from DAPS unit 102 for each car and determines a pose of each car. As used herein, "pose" refers to the position and attitude of each car during a given time period. The pose of a car at a given time may be defined by a 4×4 transformation matrix, referred to herein as a "pose matrix" which gives the position and attitude of the car at the given time. The pose matrix for a car i at a time t may have the form of:

$$\text{pose of car } i = \begin{vmatrix} f_x & u_x & s_x & 0 \\ f_y & u_y & s_y & 0 \\ f_z & u_z & s_z & 0 \\ x & y & z & 1 \end{vmatrix},$$

where f(x,y,z), u(x,y,z) and s(x,y,z) is a rotation matrix indicating the attitude of the car i at time t. In particular, f(x,y,z) is the forward vector of car i indicating the heading of car i, u(x,y,z) is the up vector of car i, and s(x,y,z) is the side vector of car i. The up vector will be the vector which is perpendicular to the surface of the track at which the car is located at time t. If the track is horizontal, the up vector will be u(0,0,1). However, when the car is on for example a banked turn, the up vector will be otherwise. The side vector is a vector perpendicular to the forward and up vectors. The x, y and z coordinates are the position of the car i at time t.

CC 120 uses various computer-implemented processes to generate a best estimate of the pose matrix for each of the cars at a given time. Using these computer-implemented processes over all time periods generates streaming data of the best estimate of the pose matrix for each of the cars. In embodiments, one of the computer-implemented processes involves a first filtering process on the data referred to herein as a state estimation process. In the state estimation process, the data and standard deviations from the various sources are used to determine a blended estimate of the best pose matrix data for each car at each measured time period. In embodiments, another computer-implemented process involves a second filtering process on the data referred to herein as an overlap correction process. The overlap correction process is an iterative process where the position of each car is checked for overlap with other cars, the track wall and the track surface. Where such overlap is found (which is not due to an actual crash), the pose matrix data for the affected car or cars is corrected to arrive at a final pose matrix for each car. The state estimation and overlap correction processes are explained in greater detail below.

The state estimation process performed on the received data in CC 120 may be carried out at least in part by one or more software filtering engines 124. One such filtering engine 124 may be a Kalman filter which, for each discrete time period, receives estimates of positional data for each car from independent sources, as well as estimates of the accuracy of the received positional data in the form of a standard deviation of the positional data, and computes a blended, best estimate for the positional data for each time period. Further, this Kalman filter may operate as a fixed lag filter in which case the estimates at time $t_k$. This allows for better error reduction in positional estimates.

The Kalman filter may receive data from at least three independent sources regarding the position of each car in the race. One source is the data returned from DAPS units 102 in each of the cars. For each time period, the DAPS units 102 return an estimate of positional data, together with an estimate of the error of that positional data in the form of a standard deviation. As indicated above, at times the DAPS unit 102 for a given car receives accurate readings of positional data. In that instance, the standard deviation received for that positional data will be low. On the other hand, at times, the confidence level in the signal received from the GPS satellite signal is low, or the signal is blocked altogether. In such instances, the standard deviation for that car and those time periods will be high.

Another source of positional data is an extrapolation carried out by the Kalman filter or other process within CC 120. The extrapolation uses positional measurements for prior time periods to predict the positional measurement in the current time period. A standard deviation for the confidence level in extrapolated data may also be determined by the Kalman filter or other process within CC 120. Extrapolations based on extrapolations become less accurate, and will have an increasing associated standard deviation. That is, if a position is extrapolated at time t, based on prior measured data, it will have a first standard deviation. If a position is extrapolated at time t+1, using in part the extrapolated data at time t, the extrapolated position at time t+1 will have a higher standard deviation than at time t. Repeated extrapolations still tend to be precise when the car is traveling in a straight line. The precision of repeated extrapolations tend to degrade much more quickly when a car is traveling around a curve.

Another method of estimating positional data for a car at a given time is from stored historical data relating to a car or cars on the same or similar track. The historical data may be generated by a number of methods. In one embodiment, pose matrix data for a car at positions on the track during prior laps around the track may be measured and recorded. This data may come from laps around the track during practice runs, time trials or other races at the same track, or it may come from earlier laps around the track in the current race. By looking at one or more of such laps, a reference line may be determined which defines an estimate of the position of the car at all times during a lap around the track. The reference line may also have an associated standard deviation. If, in all prior laps considered, the car was very close to the reference line, the standard deviation for the reference line may be low. The reference lap position versus time data may be scaled to match the most recent complete lap and the scaled position data may be used as a prediction of position data for the current lap.

In embodiments, the Kalman filter receives the positional data and standard deviation estimates from at least the DAPS units 102 and extrapolation to arrive at an estimate for the position and standard deviation for that position with respect to each of the cars in a given time period. In further embodiments, the Kalman filter receives the positional data and standard deviation estimates from at least the DAPS units 102, extrapolation and the stored historical reference line to arrive at an estimate for the position and standard deviation for that position with respect to each of the cars at a given time period.

The operation of the Kalman filter upon receiving the above-described positional data and standard deviations is known. In general, the Kalman filter in embodiments of the present invention may be implemented using the following equations:

System equation: $x_k = F_{k-1}x_{k-1} + \epsilon_k, \epsilon_k \sim N(0, \Sigma_{\epsilon,k})$ (1)

Observation equation: $b_k = A_k x_k + e_k, e_k \sim N(0, \Sigma_{e,k})$ (2)

Initial conditions: $E\{x_o\} = \hat{x}_o$ (3)

$E\{(x_o - \hat{x}_{o|o})(x_o - \hat{x}_{o|o})^T\} = P_{o|o}$ (4)

Other conditions: $E\{\epsilon_k e_j^T\} = 0, \forall k,j$ (5)

Prediction of the state vector: $\hat{x}_{k|k-1} = F_{k-1}\hat{x}_{k-1|k-1}$ (6)

Prediction of the covariance matrix: $P_{k|k-1} = F_{k-1}P_{k-1|k-1}F_{k-1}^T + \Sigma_{\epsilon,k}$ (7)

The Kalman gain matrix: $K_k = P_{k|k-1}A_k^T(A_k P_{k|k-1}A_k^T + \Sigma_{e,k})^{-1}$ (8)

Correction of state vector: $\hat{x}_{k|k} = \hat{x}_{k|k-1} + K_k(b_k - A_k \hat{x}_{k|k-1})$ (9)

Correction of covariance matrix: $P_{k|k} = (I - K_k A_k)P_{k|k-1}$ (10)

At each time step, k, the Kalman filter begins by first making predictions of the state vector (6) and covariance matrix (7), and then makes corrections. The predicted values of the state vector and the covariance matrix can be used to determine if the measurement should be incorporated via the correction formula or just discarded.

In order to smooth the data received from the various sources of positional data for each car, the Kalman filter may be implemented on the three components of each car's position independently. The model for each component is:

$$A = [1, 0, 0, 0]$$

$$x_k = \left[x_k, \frac{dx_k}{dt}, \frac{d^2 x_k}{dt^2}, \frac{d^3 x_k}{dt^3}\right]$$

$$F_k = \begin{bmatrix} 1 & \Delta t & \frac{\Delta t^2}{2} & \frac{\Delta t^3}{6} \\ 0 & 1 & \Delta t & \frac{\Delta t^2}{2} \\ 0 & 0 & 1 & \Delta t \\ 0 & 0 & 0 & 1 \end{bmatrix},$$

where $\Delta t$ is the change in time from time period k−1 to time period k.

The measurement of covariance is a 1×1 matrix given by the variance, ($\sigma^2$), the square of the standard deviation, $\sigma$:

$\Sigma_{e,k} = \sigma^2$.

The system covariance is taken to be a diagonal matrix with values taken equal to the steady state values of $P_{k|k}$:

$\Sigma_{\epsilon,k} = \text{diag}(1\ 127\ 1183\ 4912)$.

The initial state vector co-variance is taken to be a large diagonal matrix:

$\Sigma_{\epsilon,0} = \sigma_{\epsilon,0}^2 I, \sigma_{\epsilon,0}^2 = 10^8$.

With this model, equation (8) for the Kalman gain matrix may be simplified to a more efficient implementation. In particular, the Kalman gain matrix is 4×1:

$$K_k = \frac{P_{k|k-1}(:,1)}{P_{k|k-1}(1,1) + \Sigma_{e,k}},$$

and then the matrix $G = (I - K_k A_k)$ can be written:

$$G = \begin{pmatrix} \alpha & 0 \\ \beta & I \end{pmatrix}.$$

Then using the symmetry of $P_{k|k-1}$ in equation (8), and splitting it into pieces, the prediction of the covariance matrix can be written:

$$P_{k|k-1} = \begin{pmatrix} P_{11} & Z^T \\ Z & S \end{pmatrix}$$

$$GP_{k|k-1}G^T = \begin{pmatrix} \alpha^2 P_{11} & \alpha P_{11}\beta^T + \alpha Z^T \\ \alpha P_{11}\beta + \alpha Z & P_{11}\beta\beta^T + Z\beta^T + \beta Z^T + S \end{pmatrix}.$$

In general, the error estimate is given by the formula for $P_{k|k-1}$ and $P_{k|k}$. $P_{k|k-1}$ is the estimate (prediction) for the covariance matrix at time k given the known covariance matrix at time k−1. $P_{k|k}$ is the corrected covariance matrix. The corrected terms are ones that have incorporated new measurement data. The predicted terms are estimates based on prior knowledge and extrapolation to time k, without incorporating data for time k. The variance of a positional estimate (either predicted or corrected) is the (1,1) element of the associated covariance matrix. Additional information regarding Kalman filters is disclosed in U.S. Pat. No. 6,664,923, entitled, "Position and Velocity Kalman Filter for Use with Global Positioning Navigation Satellite System Receivers," and in U.S. Pat. No. 6,718,259, entitled, "Adaptive Kalman Filter Method For Accurate Estimation of Forward Path Geometry of an Automobile." Both of these patents are incorporated by reference herein in their entirety.

As discussed above, even "good" (low standard deviation) GPS data contains errors. If just GPS data were used by the Kalman filter for a given car, the car would jump around instead of smoothly proceeding along the track. By blending the GPS data with the extrapolation data through the Kalman filter, the position of the car indicated by the streaming data is smoothed out. At times, GPS data may be lost, at which time, the positional data indicated by extrapolation may then initially dominate the position indicated by the Kalman filter. The Kalman filter may also receive reference line data, but this data tends to have a comparatively high standard deviation.

However, as indicated above, over time, extrapolation data tends to degrade. At some point, the confidence level of the data obtained by extrapolation will degrade to the point where the positional data indicated by the reference line will become more significant and (in the event of continued absence of GPS data) will eventually dominate the position indicated by the Kalman filter. In such an instance, the position of the car will migrate toward the reference line. When good GPS data is again received, to the extent the position of the car indicated by the GPS data varies from that indicated by the reference line, the car will gradually migrate back to the position indicated by the blended GPS data and extrapolation data.

In addition to the estimation of the position for each car at each time k using the state estimation process as described above, embodiments of the present invention may perform the overlap correction process for correcting positional data for each car. In particular, after receiving estimates of car positions from the above-described process, the Kalman filter, or some other process within CC 120, may next check whether the estimates for car position result in any two cars overlapping with each other, the wall or the track surface. As explained hereinafter, the cars in the race are rendered using three-dimensional computer graphics on a display 154 associated with the client device 150. When rendered, the only time cars should overlap with each other or the wall is upon an actual crash of a car or cars with each other or the wall. The cars should never be shown overlapping with the track surface (the cars should always be rendered as riding on the track surface).

Accordingly, the present invention may perform the overlap correction process for checking for improper overlap of a car with another car or the wall ("improper" meaning an overlap in the absence of an actual crash). If an improper overlap between two or more cars is identified in a time period, the positional data for the cars is adjusted in the time period so as to separate the cars. If an improper overlap between one or more cars and the wall is identified in a time period, the positional data for the cars is adjusted in the time period so as to move the car(s) away from the wall.

Figure 3:
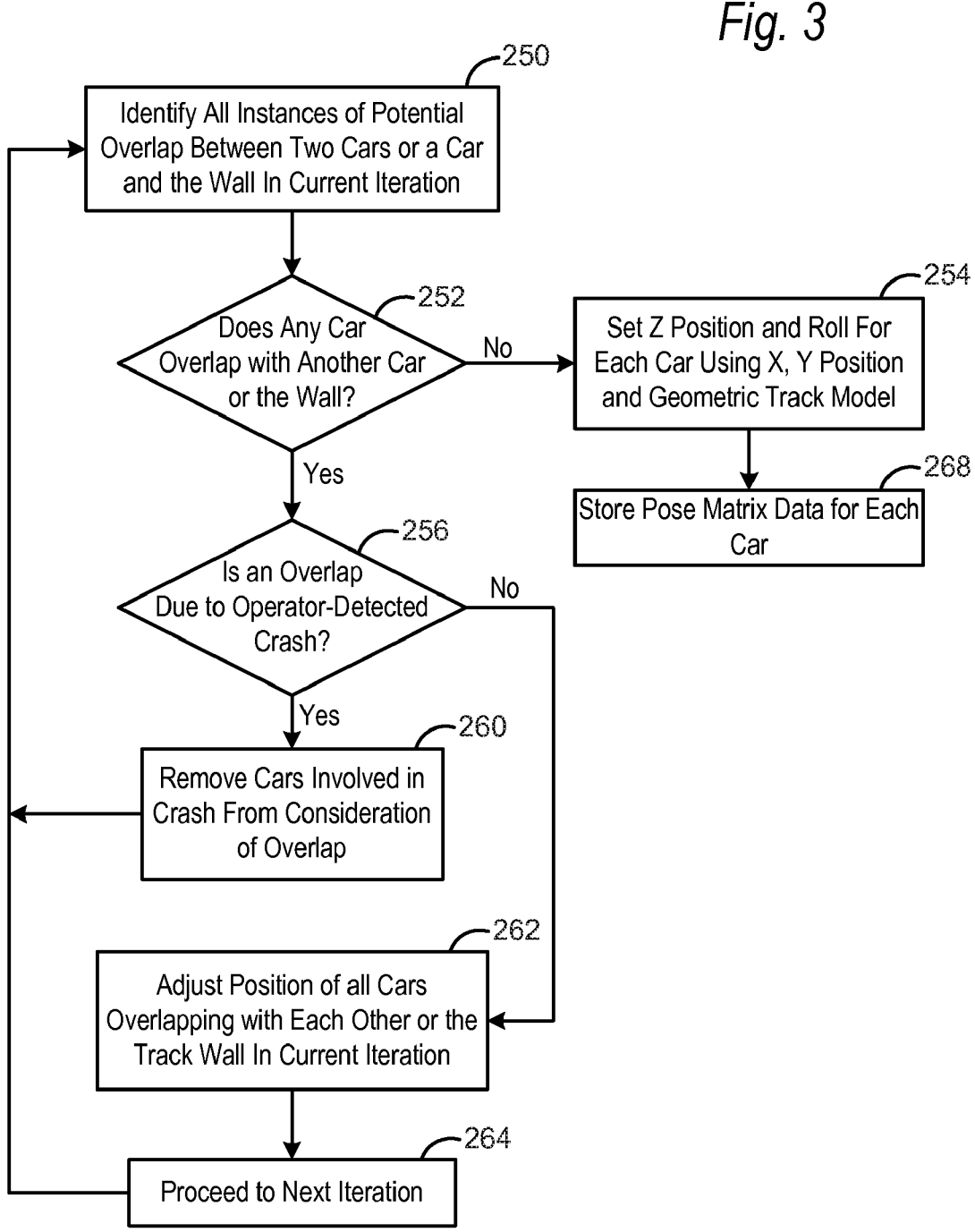
FIG. 3 is a flowchart of an iterative process for correcting the position of objects to be virtually rendered.
Figure 4:
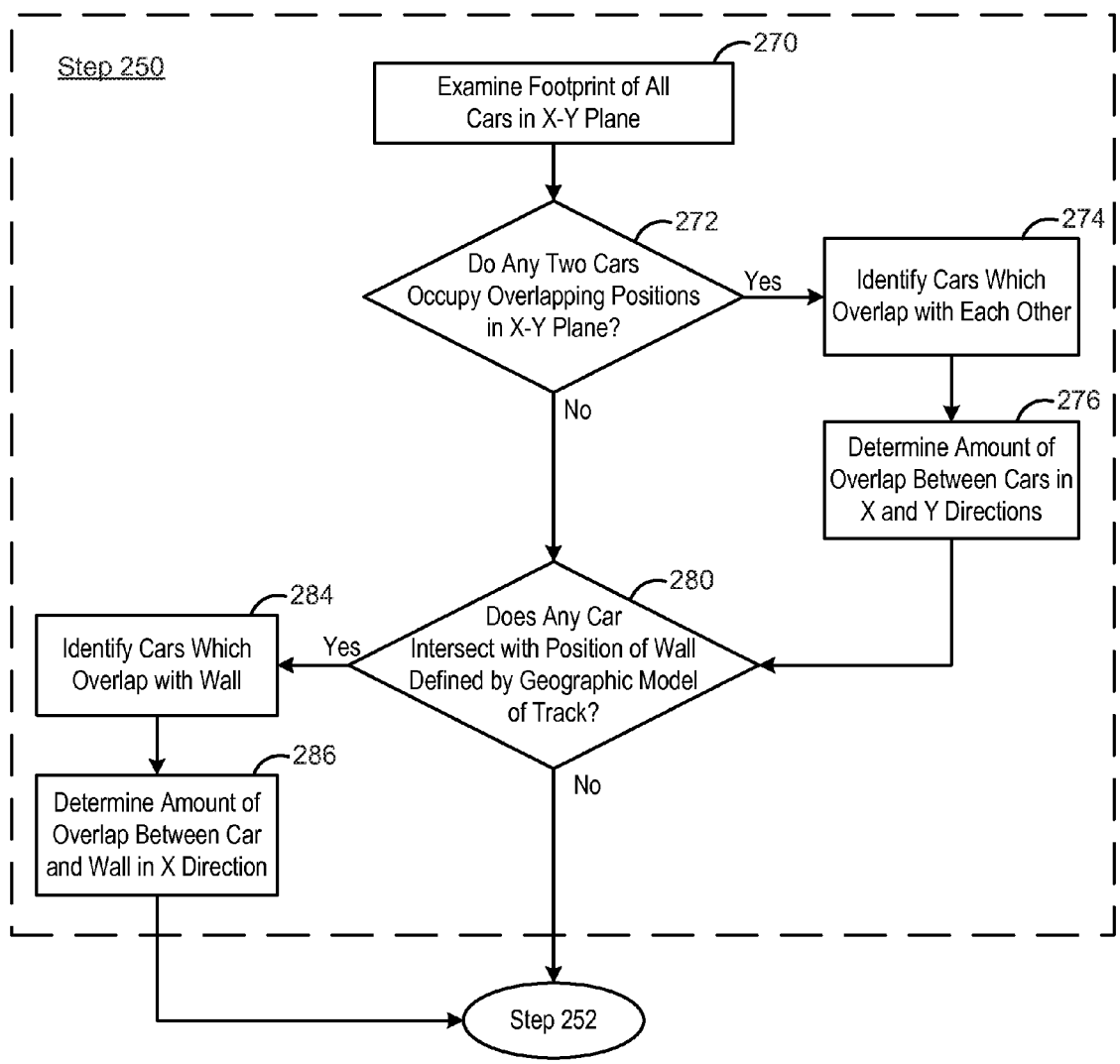
FIG. 4 is a flowchart providing additional details of step 250 of FIG. 3.

The overlap correction process is described with respect to the flowchart of FIG. 3. The overlap correction process described in steps 250-264 of FIG. 3 is an iterative process. Namely, as a result of moving a car out of overlap with another car in a first (or current) iteration through steps 250-264, one of those cars may be moved into overlap with the third car. Thus, as explained hereinafter, the process loops through steps 250-264 in successive iterations until no further overlaps are detected.

The overlap correction process of steps 250-264 may be performed by a Kalman filter, which may be part of or different than the above-described Kalman filter. The overlap correction process may alternatively be performed by a different filtering engine 124 or other process within CC 120. Moreover, as explained hereinafter, the overlap correction process, as well as the state estimation process, may be performed by a processor resident on the client device 150.

Referring to the flowchart of FIG. 3, a first step 250 performed by the filtering engine is to identify all instances of an overlap between two cars or a car and the wall in the current iteration. Step 250 is explained in greater detail in the flowchart of FIG. 4. Step 250 involves a first step 270 of examining the footprint of all cars in the X-Y plane. For the purposes of the following discussion, the Y direction is taken as the direction of travel along the track, the X direction is the transverse length of the track and the Z direction is perpendicular to the track.

Each of the cars has a known volume; that is, a known length in the Y direction, a width in the X direction and a height in the Z direction. The information received from DAPS unit 102 allows CC 120 to determine the volumetric space occupied by each car volume (in X, Y and Z coordinates) at all times. The volume used may be that of a cube with planar surfaces. However, in alternative embodiments, the actual volumetric dimension of the cars may be used. While the DAPS unit 102 may return the position of each car in terms of its state plane coordinates, using the known geometric model of the track, the CC 120 can resolve and express the position of each car in terms of the above-described X, Y and Z coordinates where Y is along the track, X is transverse to the track and Z is perpendicular to the track.

As the cars travel only on the surface of the track under normal conditions, the Z dimension of a car volume may be ignored (there will not be a normal condition where a first car occupies the same X-Y space as a second car, but is above or below the second car). Therefore, the filtering engine may search for and correct any overlap between two cars or a car and the wall by examining only the X-Y footprint of the car position.

Accordingly, in step 270, the filtering engine examines the position of the footprint in the X-Y plane of all the cars. The filtering engine may accomplish this in a number of ways. In one embodiment, each car may be compared against each other car, successively, to determine whether any of the cars compared against each other occupy the same space in the X-Y plane. Thus for example, car 1 can be compared against car 2, car 3, ..., car n; car 2 may be compared against car 3, car 4, ..., car n; etc.

As an alternative embodiment to this method, the filtering engine may make use of the fact that cars which are separated from each other by at least a predefined distance will not overlap each other. Thus, in this embodiment, car 1 will only be compared sequentially against other cars within a predefined distance of car 1; car 2 will be compared sequentially against any other cars within a predetermined distance of car 2; etc., in order to determine whether any cars occupy overlapping positions.

In a further alternative embodiment, it is contemplated that a mathematical algorithm may be applied which is capable of checking the positions of each car against each other car simultaneously given the known position of each car in X-Y space at a given time.

If it is determined in step 272 that two cars occupy overlapping positions in the X-Y plane, the overlapping cars are identified in step 274 and the amount of overlap between each such identified group of cars in the X direction and in the Y direction is determined in step 276. Step 250 further involves a step of checking whether any car intercepts the track wall in step 280. This may be determined from a known position of the cars in the X-Y plane and the known position of the wall given by the geometric model of the track. If it is determined in step 280 that a car intersects with the wall, the cars which overlap with the wall are identified in step 284, and the amount by which each such identified car overlaps with the wall in the X direction is determined in step 286.

Returning to FIG. 3, in step 252, if it is determined that no car overlaps with any other car or the wall, the position of the car in the Z direction and the roll for each car is set in step 254 as explained hereinafter. However, if it is determined in step 252 that there is an overlap between two or more cars and/or two more cars and the wall, the filtering engine next checks whether the overlap is due to an operator-detected crash in step 256.

In particular, the iterative process of the present invention only corrects the position of a pair of cars when the pose matrix data incorrectly indicates that the cars are overlapping. However, if the overlap is due to the fact that the cars have in fact crashed into one another, the overlap is not due to incorrect pose matrix data and should not be corrected. In embodiments, an operator observing the race may monitor the race for crashes, and when a crash occurs between two or more cars, the operator can provide this information via a user interface to CC 120 identifying the cars involved with the crash. In an alternative embodiment, instead of a crash being detected by an operator, an actual crash involving a car may be identified by a discontinuity in the streaming positional data received from the DAPS unit 102 of that car.

If, in step 256, an identified overlap is due to a detected crash, then the filtering engine removes the cars involved in the crash from consideration of overlap in step 260. That is, the cars involved in the crash will not be separated in the overlap correction process, and may be ignored in the process until such time as the pose matrix data for the respective cars in the crash shows that they are no longer overlapping. Upon performing step 260, the filtering engine may again return to step 250 to identify any further instances of overlap between two cars or a car and the wall in the current iteration.

If, in steps 252 and 254, one or more overlaps are detected in the current iteration which are not due to an operator-detected crash, the filtering engine then performs a step 262 of adjusting the position of all cars overlapping with each other or the track wall in that iteration. The details of step 262 are explained in greater detail in the flowchart of FIGS. 5A and 5B, and the illustrations of FIGS. 6-8. FIG. 6 is a diagram of a symbolic representation of a section of a racetrack showing racecars 1 through 9 in the positions indicated by each car's respective pose matrix data at a given instant in time before the overlap correction process. The diagram is said to be symbolic, in that the positions indicated in FIG. 6 exist within the processor and no such display is ever rendered on client device 150 (unless resulting from an actual crash). As shown in FIG. 6, the pose matrix data indicates that cars 2 and 3 overlap with each other, cars 4 and 5 overlap with each other, cars 6 and 7 overlap with each other and car 9 overlaps with the wall. It is understood that the pose matrix data may in fact indicate a lower frequency of overlap in embodiments of the present invention.

Figure 5A:
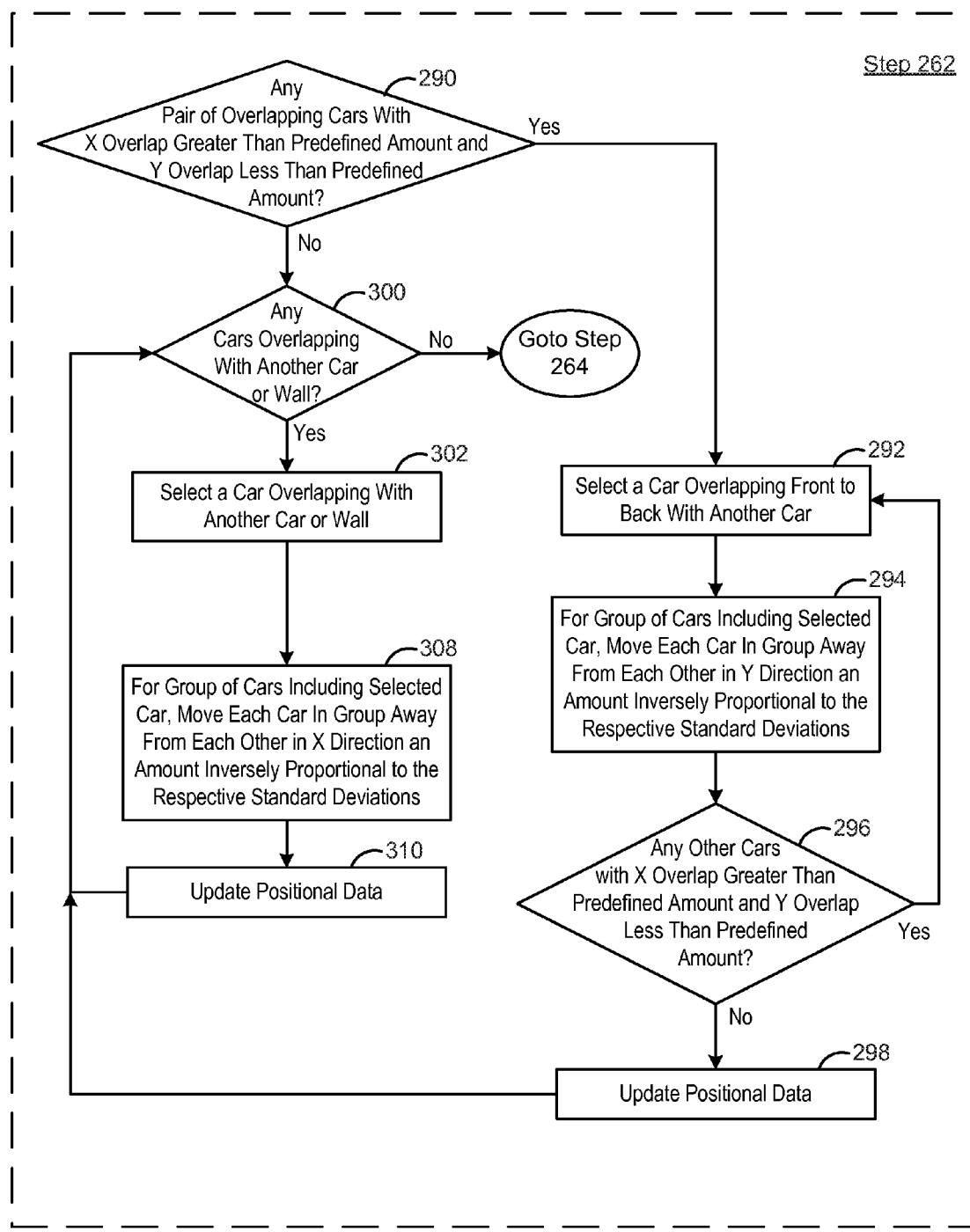
FIG. 5A is a flowchart of additional details of step 262 of FIG. 3.
Figure 6:
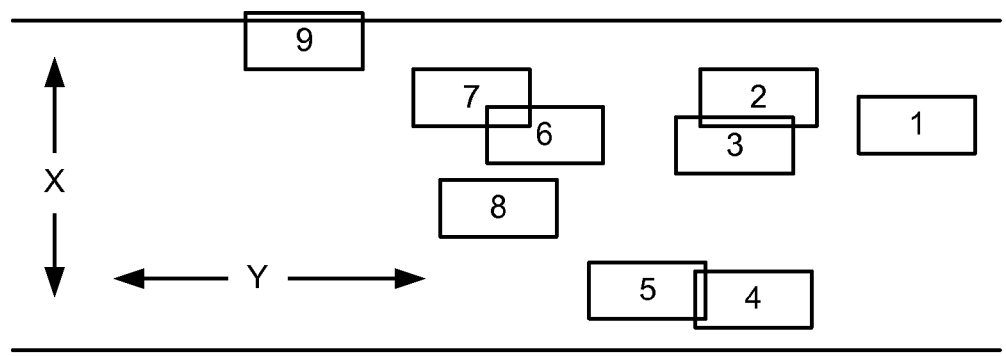
FIG. 6 is an illustration of the symbolic positioning of cars prior to correction by the iterative position correction process.

Referring now to step 290 in FIG. 5A, the filtering engine first checks for any pair of overlapping cars having an overlap in the X direction greater than a predetermined amount and an overlap in the Y direction less than a predetermined amount. In general, as explained with respect to steps 300-310, when a pair of cars are indicated to be overlapping, the filtering engine will typically separate those cars by moving them along the X direction transverse to the track length. This method separates the cars without changing the order of the cars in the race and without moving one car forward or backward relative to another car. However, there are situations, such as for example as illustrated by cars 4 and 5 in FIG. 6, where to move cars in the X direction to separate them involves a significant correction, but to move the cars in the Y direction involves only a minor correction.

Accordingly, if the filtering engine determines in step 290 that a pair of cars overlap in the X direction greater than a predetermined amount, and in the Y direction less than a predetermined amount, the filtering engine may separate the cars by moving them apart in the Y direction. The predetermined amount of X overlap and Y overlap in step 290 may vary in alternative embodiments. In one embodiment, where the overlap in the X direction is greater than 75% of the car widths, and the overlap in the Y direction is less than 10% of the car lengths, the filtering engine may branch from step 290 to step 292. It is understood that the above-described predetermined X and Y overlaps may be greater than that or less than that in alternative embodiments of the present invention.

In step 292, the filtering engine selects a car overlapping front-to-back with another car, as for example car 4 in FIG. 6. The filtering engine may select a car by sequentially examining each car involved in the front-to-back overlap described in step 290. In step 294, for the group of cars including the selected car, the filtering engine moves each car in the group away from each other in the Y direction by an amount proportional to the respective standard deviations returned by the Kalman filter in the state estimation process for the positions of those cars. For example, in FIG. 6, if the standard deviation for car 4 were lower than for car 5, the present invention would move car 5 a greater amount than car 4. In one embodiment, the movement of each car involved in an overlap may be directly proportional to the ratio of the respective standard deviations. Thus, if the standard deviation for car 4 were twice as high as that for car 5, in separating the cars, car 4 would move twice as much as car 5. The amount of the overlap was identified in step 270. The cars may be separated a predetermined amount slightly greater than the identified amount of the overlap.

Once the positions of the cars have been corrected, the pose matrix data for the respective cars is updated to reflect the corrected positions of the cars (step 298). This step may require resolving the change in position in the Y direction in the track reference to the corresponding change in position in the ECEF coordinate system reference.

In step 296, the filtering engine checks whether any other cars have an X overlap greater than the predefined amount, and a Y overlap less than the predefined amount. If yes, the filtering engine branches back to step 292 to select another car in a group of cars overlapping in such a manner. If, however, step 296 determines that there are no other such front-to-back end overlapping cars, the filtering engine moves to a step 300.

In step 300, the filtering engine checks whether any other overlaps are identified for the current iteration. If not, the present system performs a step 264 (FIG. 3) of proceeding to the next iterative loop of checking for overlapping cars. However, if in step 300, there are additional instances of a car overlapping with another car or wall, the filtering engine performs a step 302 of selecting a car which overlaps with another car or wall. The filtering engine may select a car by sequentially examining each car involved in an overlap.

As explained below, an instance of an overlap of a car with the track wall is handled by the filtering engine in the same manner as an overlap between two cars. However, as the position of the wall is known to a certainty, the standard deviation for the position of the wall is zero. Consequently, when moving a car apart from the wall by a distance directly proportional to their standard deviations, the wall will remain stationary and the car will move until separated from the wall.

Similarly, when first and second cars are overlapping, and the position of the first car is directly adjacent to the wall, then in separating those cars, the second car will be moved transversely across the track away from the first car and wall while the first car remains stationary relative to the wall.

The filtering engine next performs step 308 of separating overlapping cars by moving them transversely in the X direction. In particular, for the group of cars including the car selected in step 302, the filtering engine moves each car in the group away from each other along the X direction an amount directly proportional to the standard deviations of the cars involved in the overlap.

Once the positions of the cars have been corrected, the pose matrix data for the respective cars is updated (step 310) to reflect the corrected positions of the cars. This step may require resolving the change in position in the X direction in the track reference to the corresponding change in position in the state plane coordinate system reference.

As described above, cars are separated by moving them in the X or Y directions, each by an amount proportional to their standard deviations. It is understood that separation may occur by different rules in alternative embodiments. For example, cars may be separated by moving the cars apart by equal movements of both cars. Moreover, overlapping cars may be moved forward or backward without regard to their position in the race in alternative embodiments. It is also contemplated that cars be separated by moving one or both cars in both the X and Y directions, or along a diagonal, in further embodiments of the invention.

Once the cars in the group of cars including the selected car are separated in step 308, the filtering engine returns to step 300 to determine whether there are any other cars in the current iteration overlapping with another car or the wall. If so, steps 302-310 are repeated. If not, the filtering engine proceeds to the next iteration in step 264.

Figure 5B:
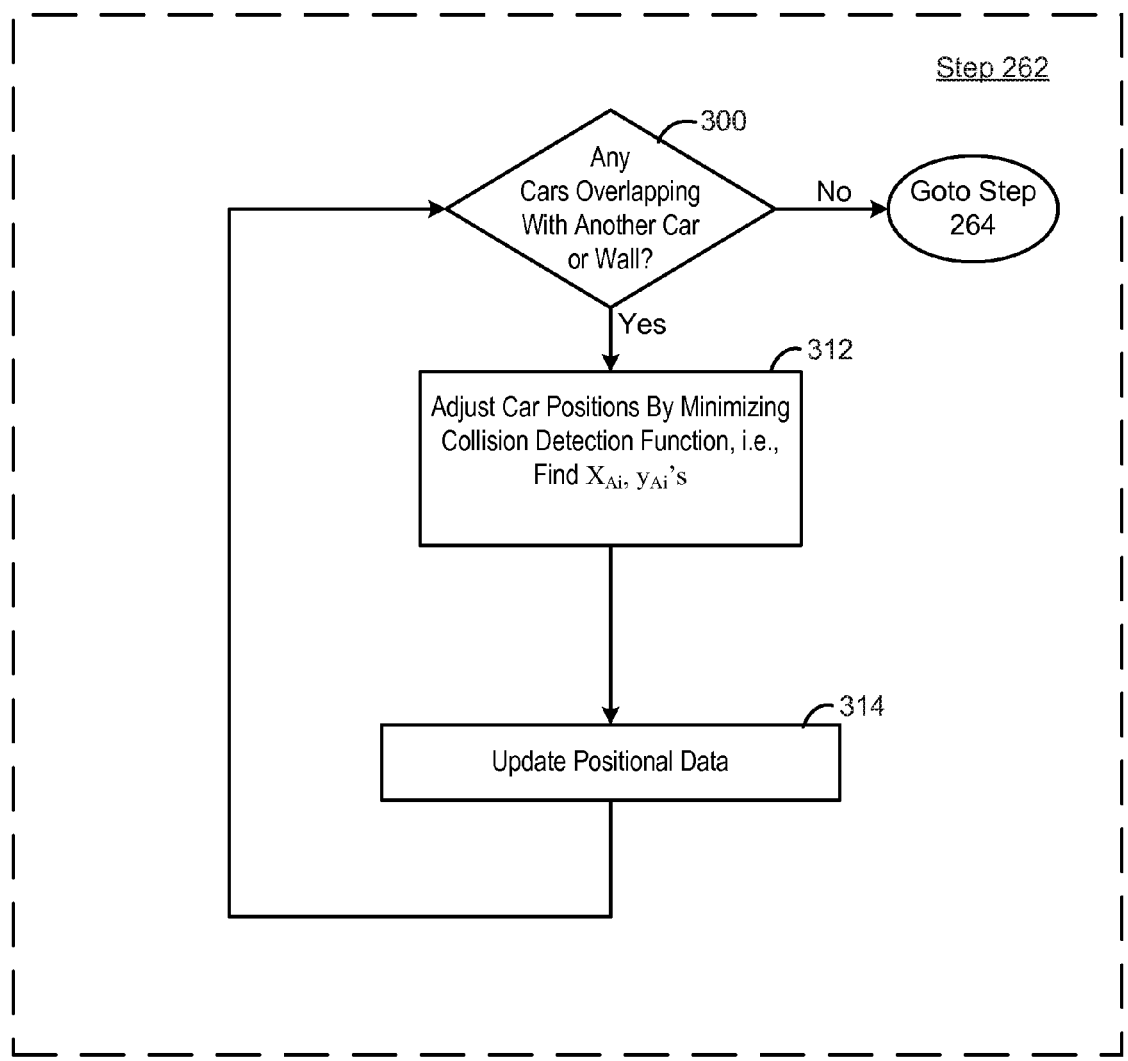
FIG. 5B is a flowchart of an alternative embodiment of additional details of step 262 of FIG. 3.

FIG. 5B is an alternative method for performing step 252 of detecting car-car or car-wall overlap. In the embodiment of FIG. 5B, overlap is detected in step 300 as described above. If no overlap is detected, the method proceeds to step 264 as described above. If overlap is detected, a step 312 is performed of adjusting car positions by minimizing a collision detection function. Namely, in step 250 all cars that potentially overlap were identified in the current iteration: =Np.

The collision detection function, CDF, may then be given by:

$$CDF = \sum_{i=1}^{Np} \left\{ \frac{(x_{K_c} - x_{A_i})^2}{\sigma_{x2}} + \frac{(Y_{K_i} - Y_{A_i})^2}{\sigma_{y2}} + \sum_{j=1}^{j \leq i} d_{ij}^2 \cdot OLF \right\} \sum_{k=1}^{Np} w_k^2 \cdot OLF \right\}$$

where:
$Y_{K_i}, Y_{K_i}$—estimate pos of car I at start of overlap correction process
$X_{A_i}, Y_{A_i}$—Adjusted pos of car I at start of overlap correction process
$d_{ij}$—Amount of overlap between car i+j at $(X_{A_i}, Y_{A_i})$, $(X_{A_j}, Y_{A_j})$
$w_k$—Amount of collision between car I at $(X_{A_k}, Y_{A_k})$ and wall
OLF—A constant to create a large penalty for overlaps; may for example be $10^8$.

Once all $X_{A_i}, Y_{A_i}$ are identified, the position of the cars may be adjusted in the current iteration in step 314. The method then returns to step 300 to check for any further car-car or car-wall overlaps.

Figure 7:
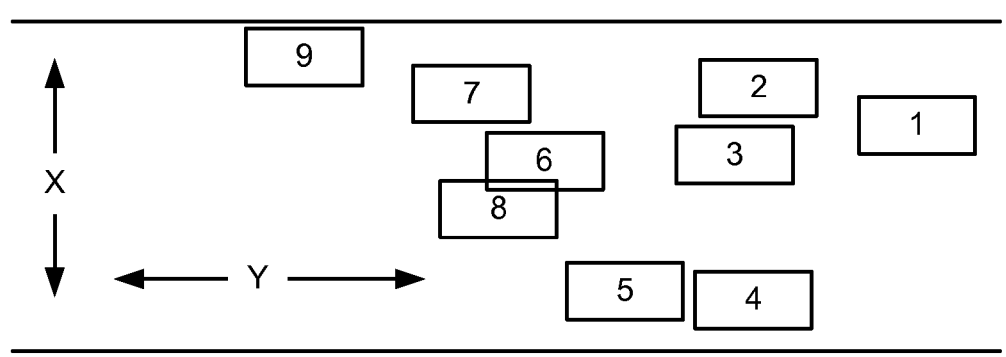
FIG. 7 is an illustration of the symbolic positioning of cars after a first iteration position correction process.

Referring to FIGS. 6 and 7, in step 250, the filtering engine identified all instances of overlap; namely, cars 2 and 3, cars 4 and 5, cars 6 and 7, and car 9 with the wall. Cars 4 and 5, overlapping back-to-front, were separated by the filtering engine performing steps 292 through 296. In step 300 there were still overlapping cars from the current iteration (cars 2 and 3, cars 6 and 7 and car 9 with the wall). In step 302, the filtering engine may select an overlapping car from a successive examination of the identified overlapping cars. The filtering engine may select car 2 in step 302. Cars 2 and 3 may be separated by moving each car directly proportional to the relative standard deviations of cars 2 and 3. The pose matrix data for cars 2 and 3 may be corrected to reflect the new, corrected positions of cars 2 and 3.

The filtering engine may then return to step 300 to see if remaining overlaps exist. As cars 6 and 7 and car 9 each involve an overlap, the filtering engine would then again perform step 302, and select the next successive car, car 6, involved in an overlap. Cars 6 and 7 would be separated in step 308, the pose matrices for cars 6 and 7 can be corrected and the filtering engine may again return to step 300 to check for further overlaps.

As an overlap of car 9 with the wall still exists, the filtering engine would perform step 302 of selecting an overlapping car, i.e., car 9, and the overlap of car 9 with the wall would be corrected in step 308. As discussed above, as the wall would have a zero standard deviation, car 9 would be moved along the X direction away from the wall while the wall remained stationary. The filtering engine would then again branch to step 300, where no further overlaps would be detected. The filtering engine would then proceed to step 264. FIG. 7 represents a movement of the cars shown in FIG. 6 upon performing the steps 290-310 of FIG. 5.

Figure 8:
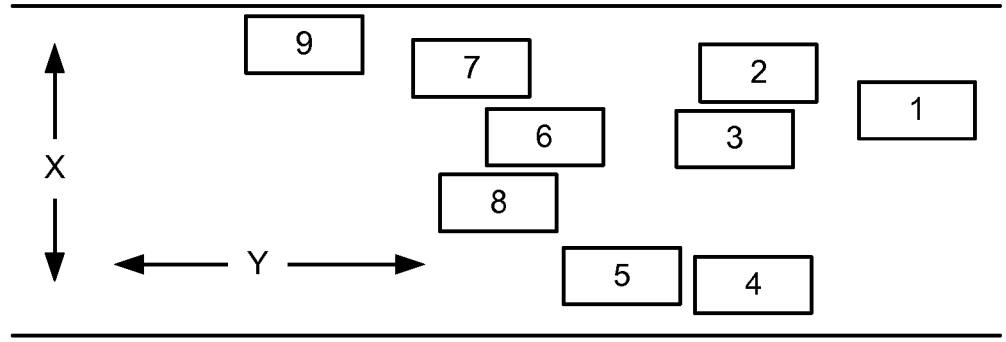
FIG. 8 is an illustration of the symbolic positioning of cars after all iterations are completed.

The overlap correction process of steps 250-264 is an iterative process. Namely, as can be seen in FIG. 7, in separating the overlap of cars 6 and 7, car 6 was moved into overlap with car 8. Referring again to FIG. 3, in step 264, the filtering engine proceeds to the next iteration where, in step 250, the filtering engine again identifies all instances of overlap between two cars or a car and the wall in the current iteration (which resulted from the movement of cars in the prior iteration). In the examples of FIGS. 6 and 7, in the current iteration, the filtering engine would detect an overlap between cars 6 and 8 and would perform step 262 (steps 290-310, FIG. 5) to separate cars 6 and 8. As shown in FIG. 8, after cars 6 and 8 have been separated, no further overlaps exist, and the pose matrix for each of the cars has now been corrected. Accordingly, in the next iteration through the loop, steps 250 and 252 would detect no overlap, and the filtering engine would proceed to step 254.

In step 254, after the X-Y positions of each of the cars has been corrected, the Z position and the roll for each car is corrected. In particular, the X-Y position for each car is known. Moreover, the track geometry (Z height and slope, or bank, of the track at that X-Y position) is known. Accordingly, the position of the car along the Z axis is set to rest on top of the track at that X-Y location, and the roll of the car is set to match that of the bank of the track at that X-Y position.

It is understood that instead of using the track geometric model to set the Z position and roll for a car to a given X-Y position, the data received from DAPS unit 102 may instead be used to set Z position and roll in alternative embodiments of the present invention.

After performing step 254, the positions of each of the cars in three dimensional space have been fully corrected and are now ready for download and virtual rendering on a client device as explained hereinafter. The corrected positional data may be stored in a database 126 as explained hereinafter. It is noted that the one or more loops through steps 250 through 264 of the overlap correction process are performed for each time period for which data is obtained.

As seen on FIG. 1, CC 120 may further include a database 126 in the computing device memory. Database 126 may be located outside of CC 120 in further embodiments, such as for example within web server 130 or elsewhere. In embodiments, the streaming positional data for each of the cars may be stored in database 126. This data may be stored as raw data received from the DAPS units 102 and/or as corrected data after filtering by the filtering engine 124. Alternatively, the streaming positional data for each of the cars may only be buffered in RAM on CC 120, and then sent to web server 130 for downloading to the client device 150 as explained hereinafter. As is also explained hereinafter, computer graphics data for rendering a virtual sky, track and the appearance of each of the cars may also be stored in database 126. The computer graphics data for each of the cars is used together with the streaming car positional data to render the cars in their real time position in the race over client device 150.

A method for generating the three-dimensional computer graphics data for the racetrack, sky and cars is known, and may be accomplished for example under the OpenGL® or DirectX® specifications. In particular, in embodiments, a geometric model of the track where a race is taking place may be generated using measured data points, and/or aerial photographs of the track (this model may be the same as or different from the geometric model of the track discussed above used to constrain GPS positioning). The geometric model may be comprised of a plurality of polygons which together form a wireframe representing the topography of the racetrack including the asphalt, infield, stands and billboard. The wireframe geometry of the track may be stored for example as the position in three-dimensional space of a plurality of vertices of polygons, such as for example triangles. An example of the stored wireframe geometry of the track may be:

$$pos \quad x_1, y_1, z_1$$
$$pos \quad x_2, y_2, z_2$$
$$pos \quad x_3, y_3, z_3$$
$$\vdots$$
$$pos \quad x_n, y_n, z_n$$

where each of the vertices defines a triangle of wireframe geometry. The positions of these plurality of vertices stored in memory together define the wireframe geometry of the track.

As is known, a texture map may be generated for application to the wireframe geometry. The texture map may be generated from aerial photographs of the track and/or an artist's rendering of portions of the track. The texture data may be stored as portable network graphics (PNG) bitmap image format, though it is understood that other image formats are possible. The texture map may specify a variety of features creating a realistic displayed appearance of the wireframe geometry, including for example a color, shading, texture and/or light for pixels of each of the triangles of the wireframe geometry. When displayed as computer graphics, the wireframe geometry and texture map for the racetrack together provide the virtual racetrack with a realistic appearance of the actual racetrack where the race is taking place. It is also contemplated that features that are not present at the actual racetrack be included in the wireframe and texture data for the track. For example, advertisements may be added to the virtual rendering of the track in a known manner even though those advertisements do not exist at the real racetrack.

Data for the geometric model and texturing of the racetrack may be stored in database 126. The appearance of a racetrack may change over time or with a change in seasons. For example, billboards may change, the lighting may change over the course of the day, and grass and trees in the infield or elsewhere may change with a change in seasons. It is contemplated that the texturing data may be changed to represent the actual appearance of the racetrack at the time of the race and throughout the race.

Similarly, in a known manner, the sky to be depicted in the virtual display of a race may be modeled using polygons as described above to generate a dome-shaped wireframe geographic model of the sky. A texture map may be generated, for example in PNG bitmap image format, specifying the color and shading for pixels in the wireframe geographic model. The wireframe geometry and texture map for the sky may be stored in database 126.

In embodiments, texture maps for different appearances of the sky (sunny, cloudy, overcast, etc.) may be stored in database 126, and a particular appearance selected for display based on the weather conditions at the actual race. In particular, a plurality of stored textures representing different sky appearances may be stored in database 126, and an operator may select one of them via a user interface with CC 120. In alternative embodiments, instead of predefined stored sky texture maps, the weather conditions at the actual race may be modeled with texture data prior to and/or during the race, and represented in the texturing data that is stored and displayed in the virtual rendering. The weather condition at the actual race may be measured or taken from a third party such as a website for providing weather at different geographic locations.

Similarly, in a known manner, each of the cars in the race may be modeled using polygons to generate wireframe geometric models of the cars. Texturing data indicating the color and shading of the pixels in each of the polygons may then be generated and stored with the geometric data in database 126. In embodiments, the texture map for each car may replicate the appearance of the corresponding real car in the race. That is, if car number 3 is red with a sponsor's emblem, the texture map to be applied to car number 3 may include this information.

As explained in greater detail hereinafter, depending on a field of view selected by a user, cars in the real race may be virtually rendered on a display of the client device in their real time position on the track by specifying the cars' associated wireframe geometry, texture map and poses of the cars. The wireframe geometry and texture map for each of the cars does not change during the race, and may be downloaded and stored in the client device graphics card memory before the race. The pose matrix for each car may be updated and streamed to the client device, for example 20 to 60 times each second. Once a user selects a field of view from which he or she wishes to view the race, the geometry, texture and pose matrix for each of the cars to be rendered on the display may be selected as described hereinafter, and the cars appearing in the field of view may be rendered in the appropriate position, from the appropriate perspective and with the appropriate appearances.

Database 126 may store data in addition to the computer graphics data for the displayed virtual objects. Database 126 may store data for all of the cars from past races and/or time trials on the racetrack. This data from past races may be the position, velocity, acceleration, jerk and attitude for all cars and for all measured time periods. As explained above, this data may provide a reference line for each of the cars which may be used by the filtering engine 124 to correct the position of one or more of the cars for the display. Database 126 may further store an applet to be downloaded and run on client devices 150 to enable three-dimensional virtual rendering of a live event as explained hereinafter.

Web server 130 may be provided for receiving requests from client computing devices 150, downloading the initial graphics data from database 126, and streaming the positional data of the racecars from CC 120. In embodiments, the web server 130 may be a SHOUTcast® streaming media server running SHOUTcast® software developed by Nullsoft and owned by AOL LLC, Dulles, Va. The SHOUTcast® server is capable of receiving streaming data and replicating for distribution to a large number of client devices simultaneously. In alternative embodiments, the CC 120 and web server 130 may be combined into a single computing and web server device. Web server 130 may store one or more applets and, in embodiments, html code for presenting a web page. The one or more applets and html code may be downloaded and run by a browser on client devices 150 to enable three-dimensional virtual rendering of a live event as explained hereinafter.

Client computing device 150 may be any of a variety of computing devices such as a personal computer having a graphics card, associated display and a network connection. It is understood that client device 150 may be other devices such as a laptop computer, hand-held computer, personal digital assistant and/or a mobile smart phone. In embodiments, the graphics card may include 32 Mb of memory or more, though it may be less than that in alternative embodiments. The client device 150 may run browser software enabling the client device 150 to download and display one or more web pages from server 130, and to interact with server 130. In operation, a user would start their browser process and access web server 130 via a network such as the Internet 140 by entering the URL of web server 130.

Upon accessing web server 130, server 130 may download an applet 152 to the client device 150. As explained below, the applet may control the download and streaming of data, and may provide data to the client device graphics card for the virtual rendering of the automobile race over the client device display. Upon accessing web server 130, server 130 may download additional html code. As explained below, this html code may enable the browser to set up a web page on the client device display for the virtual rendering. The webpage may also provide a user interface on the display for accepting user input. It is understood that the html code for the webpage may be incorporated as part of the above-described applet. Alternatively, the html code for the webpage may be included in a second applet. Moreover, instead of rendering the graphics in a browser webpage, the applet may set up a user interface on the display of the client device that is not run by the browser or within a webpage.

Figure 9:
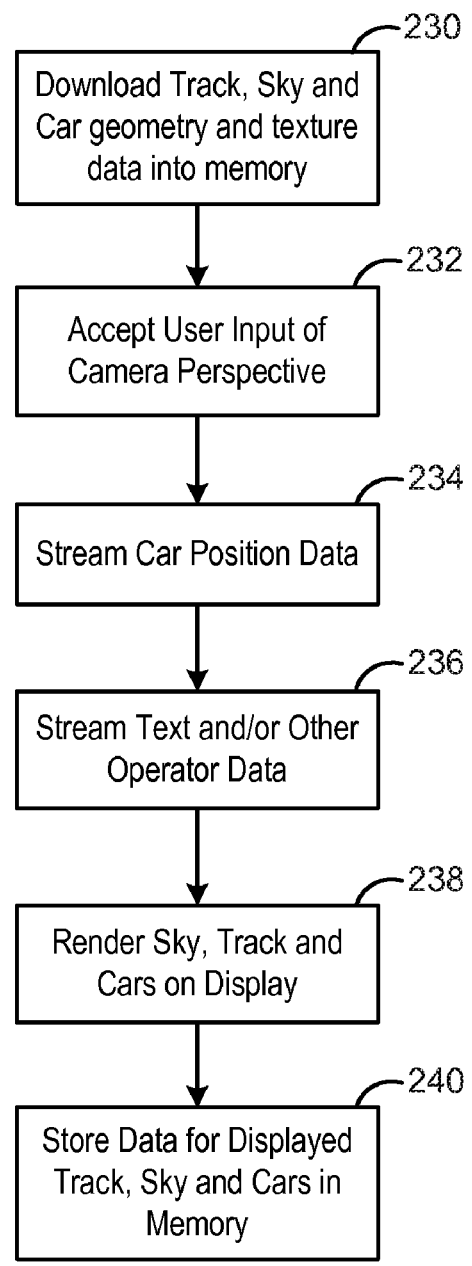
FIG. 9 is a flowchart of the operation of an applet downloaded from a web server to a client device according to the present invention.

FIG. 9 is a flowchart of the operation of the applet once downloaded onto client device 150. In step 230, the applet downloads the geometric wireframe data and texture map data for the track, sky and each of the cars into the RAM of the client device. The data may initially be loaded into RAM for the client device, and then, depending on the capabilities of the client device, some or all of the data may be transferred to RAM on the graphics card. Buffering the data in RAM of the client device and/or graphics card allows the user to pause or rewind the rendered display. In step 232, the applet receives the field of view specified by the user via the user interface as explained hereinafter. The user may alternatively specify the field of view prior to or while the wireframe and texture data is being downloaded.

In step 234, the pose matrix data for the cars may be continuously streamed from the web server 130 to the client device 150. In embodiments, a pose matrix for each of the cars may be streamed to the client device 150 for example 20 to 60 times per second in step 234. In alternative embodiments, the graphics card processor may do an initial calculation to determine which cars may possibly be visible on, and to be displayed from, the selected field of view (for example using data from previous time periods as explained hereinafter). In such an embodiment, the applet may only stream the data for those cars and any other cars within a predetermined proximity to those cars in step 234. The pose matrix data for each of the cars streamed in step 234 may be held in the client device RAM, the graphics card RAM, or a combination of the two.

In step 236, text and/or other operator-controlled data may be downloaded to client device 150. As explained hereinafter, this text may be a closed-caption display of the race commentary, or may be other data, such as for example a listing of the race leaders.

In step 238, the sky, track and cars are rendered on the display. In embodiments, the rendered image may be displayed back to front; that is, the sky is rendered, then the track is rendered and then the cars are rendered. The sky, track and cars may be rendered in different orders in alternative embodiments. The sky and track are static and may be rendered from the data stored in RAM, depending on the selected field of view. The graphics card processor may determine the portion of the sky and track which is visible and to be displayed based on the field of view of the rendered image in a known manner. The graphics card may also determine the appropriate depth perception appearance of the rendered portions of the track and sky. That is, portions of the track that are in the foreground appear to be larger than portions of the track that are in the background. Using the selected field of view and transformation matrices within the graphics card in a known manner, the graphics card processor can render the track and sky with the proper depth perception appearance.

As the track and sky are static (i.e., they do not move), the track and sky may be rendered from the wireframe and texture map data of the sky and track that is initially downloaded to the client device in step 230. However, as the cars are moving, rendering of the cars on the client device display is accomplished by the graphics card using the initially downloaded wireframe and texture map defining the appearance of the cars, and the streaming pose matrix data of the cars received in step 234. For each car to be rendered on the display, the graphics card processor receives a designation of the wireframe geometry and texture for the car, as well as the pose matrix data for the car.

From the pose matrix data and the selected field of view, the graphics card processor may determine which of the cars and/or portions of cars are within the field of view and to be displayed in a known manner. The graphics card can also render the car(s) on the display in the appropriate position relative to the selected field of view. Moreover, using the selected field of view and graphics card transformation matrices in a known manner, the graphics card can also render the cars/portions of cars with the proper depth perception appearance.

In embodiments, a 2-5 second delay may be implemented between the real time position of the cars in the actual race, and the corresponding positions of the cars generated by CC 120 and rendered on the client device display. It is understood that the delay may be greater or lesser than that, and that there may be essentially no delay, in alternative embodiments.

The graphics card may receive new pose matrix data for each of the cars 20 to 60 times per second. The sky, track and cars may also be rendered on the display as described above 20 to 60 times per second. As this refresh rate is faster than the human eye can discern, the rendering appears as a continuous motion.

In step 240, the data for the track, sky and cars may be stored in memory so that it may be replayed or played back at a later time. The data which is stored may be the actual displayed data. This allows a replay of the race from the same field of view from which it was first displayed. Alternatively or additionally, the track and sky data stored in RAM, and the pose matrix data streamed to the client device, may be stored in permanent memory. This allows the race to be played back from a field of view which may be different than the perspective which may have been chosen during an earlier viewing of the race.

In the above-described embodiments, the state estimation process and overlap correction process are carried out by filtering engines or other processes running within the CC 120. In a further embodiment of the present invention, one or both of the state estimation and overlap correction processes may be carried out by filtering engines or other processes running on the client device 150, under the control of the downloaded applet.

Figure 10:
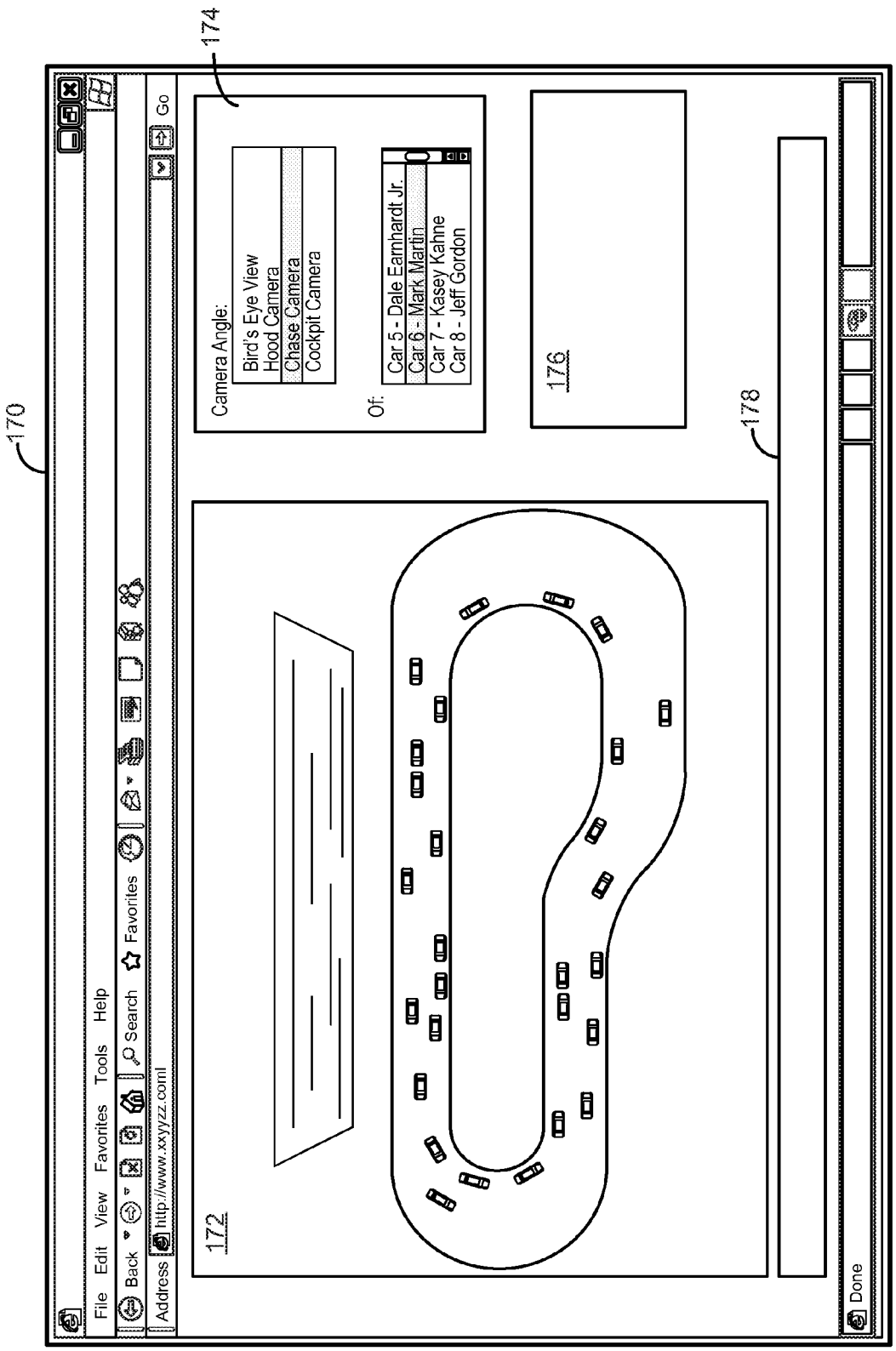
FIG. 10 is a graphical user interface for a virtual rendering of a live event.
Figure 11:
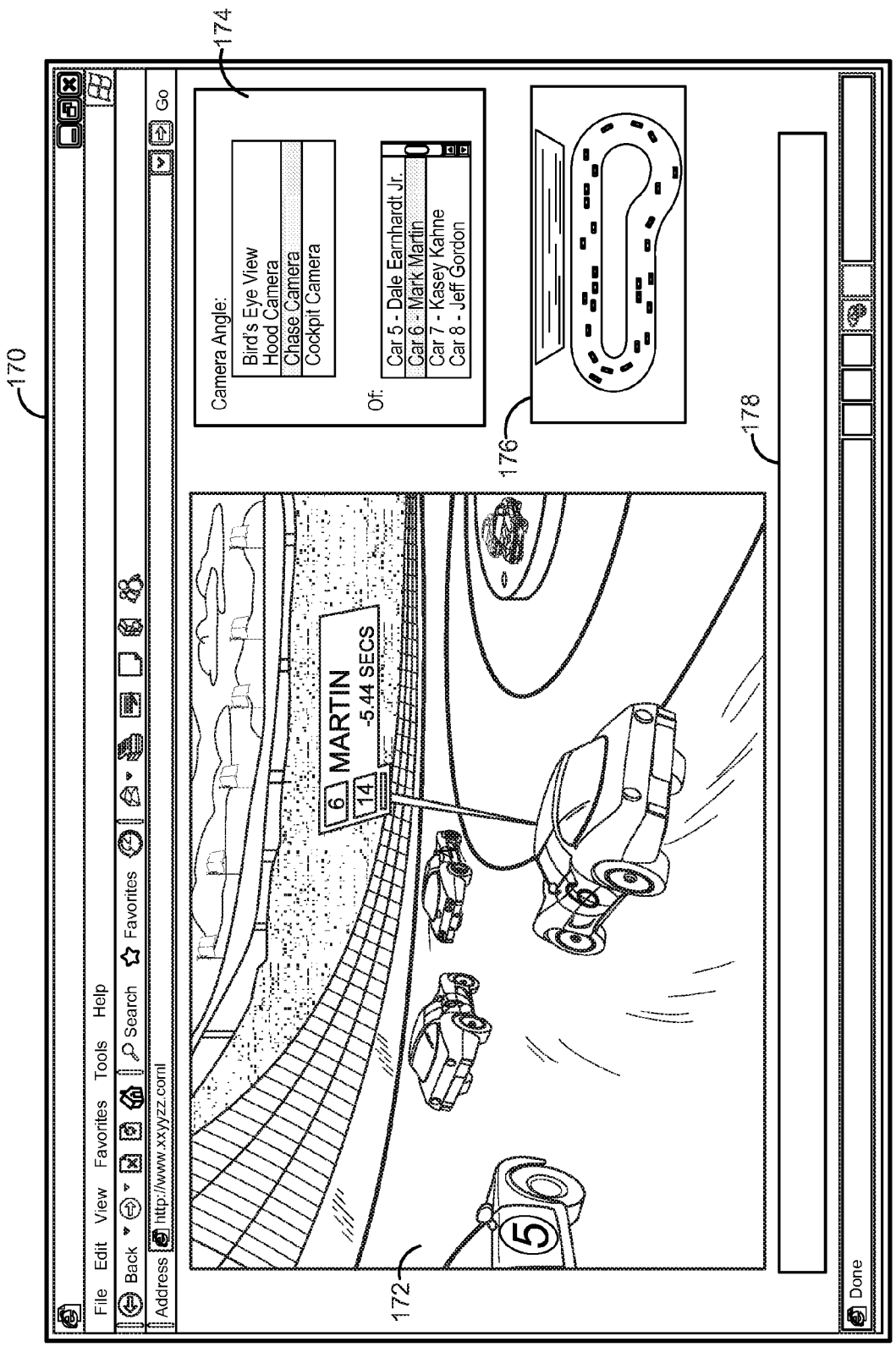
FIG. 11 is a user interface showing a virtual three dimensional rendering of a live event.
Figure 12:
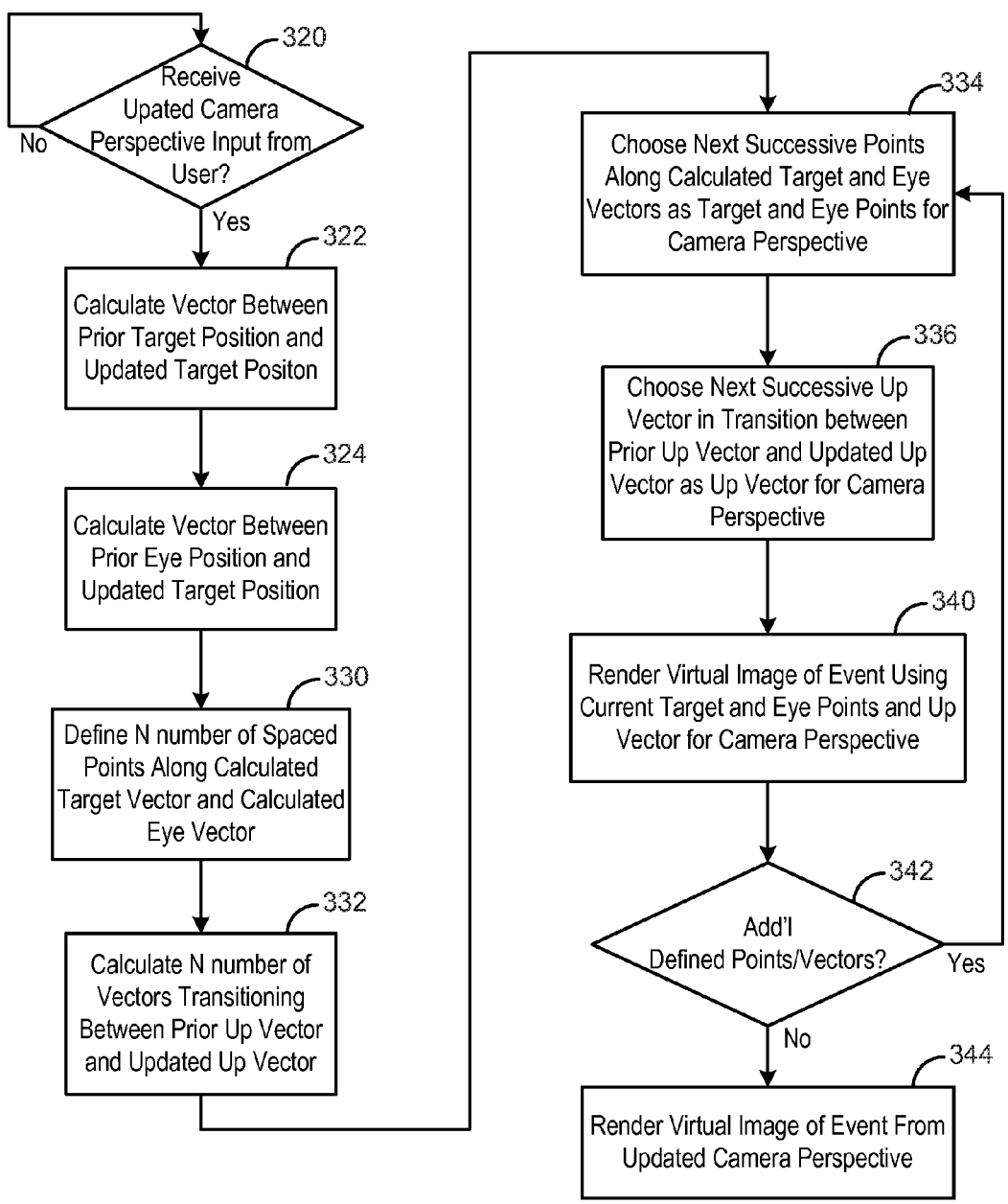
FIG. 12 is a flowchart showing the steps for smoothly transitioning between a prior camera perspective and an updated camera perspective.

FIGS. 10 and 11 are illustrations of a graphical user interface 170 which may be presented over the display of a client device 150 in accordance with the above-described steps. While user interface 170 may have a variety of configurations and a variety of different windows, in an embodiment, interface 170 may include a 3-D virtual rendering window 172, a camera perspective window 174, a 2-D viewing window 176 and a text window 178.

Upon download of the applet as described above, 3-D window 172 may be blank, or may show a bird's eye view of the racetrack as shown in FIG. 10. If a viewer is viewing a race prior to its start, the 3-D virtual rendering window 172 may provide a bird's eye view showing all of the racecars in their positions at the start line.

Camera perspective window 174 may be provided to allow a user to select a viewing perspective. The term "camera perspective" may be used for its familiarity to the user. As objects are rendered in the present invention using computer graphics and not video, there is no actual camera; the phrase as used herein instead refers to a field of view of the rendered image. In an embodiment, a user may select a bird's eye view, "hood camera," which is a view from the hood of a selected car, "chase camera," which is a view from behind a car, or "cockpit camera," which is a view from within a cockpit of a selected car. Where a user selects a hood, chase or cockpit view, the user may further be provided with a dropdown menu listing the cars and/or drivers in the race so that the user may specify from which car the user would like to position the virtual camera. In the example of FIG. 10, the user has chosen a view from behind car 6 driven by Mark Martin. This is by way of example and the user may select any of the views for any of the drivers.

As better seen in FIG. 11, 2-D viewing window 176 may provide a two dimensional bird's eye view of the race. Text window 178 may receive text and other data designated by an operator 128 (FIG. 1) for downloading via web server 130. Any variety of text may be downloaded, such as for example a closed caption transmission of the broadcast commentary of the race, or a scrolling list of the racers within the race and their current position within the race.

Choosing the camera angle and driver from window 174 defines the field of view to be rendered by the graphics card within the 3-D virtual rendering window 172. It is noted that the rendered display does not in fact come from a camera. However, for ease of use, this terminology may be used within window 174. Other terminology may be provided for allowing a user to define the field of view to be rendered. By making selections within window 174, a user sets a target, eye and an up vector which define the field of view to be rendered on the display. The target is what the user has selected to look at. The eye is the position from which the field of view is generated (if this were a video broadcast, the eye would be the position of the camera). And the up vector defines the rotational orientation of the field of view.

Once a user selects a camera angle and driver from window 174, the target position, eye position and up vector may be generated according to predefined rules within the downloaded applet. For example, in an embodiment, choosing a bird's eye view may set the target as a geometric center of the racetrack (which point may be selected manually beforehand and stored). The eye may be set as a point for example 1,000 feet above the racetrack, and an arbitrarily defined up vector may be set which is generally horizontal, and may orient the track so that the lengthwise dimension of the track is rendered across the larger dimension of the display. A point higher or lower than 1,000 feet may be used in alternative embodiments.

Choosing a hood view from a selected car designates a target position of the selected driver's car, an eye position for example 20 feet in front of the driver's car, and an up vector generally perpendicular to the surface of the track over which the eye point is located (given by the geometric model of the track). The eye position 20 feet in front of the driver's car may be calculated using the car's heading contained in the pose matrix for the car. The eye position may be greater than or lesser than 20 feet in alternative embodiments. Similarly, the eye position need not be directly in front of the selected car. It may instead be off to one side or the other of the heading vector.

Choosing a chase view from a selected car designates a target position of the selected driver's car, an eye position for example 20 feet behind the driver's car, and an up vector generally perpendicular to the surface of the track over which the eye point is located. The eye position 20 feet in front of the driver's car may be calculated using the car's heading contained in the pose matrix for the car, or from pose matrices for the car from earlier times. The eye position may be greater than or lesser than 20 feet in alternative embodiments. Similarly, the eye position need not be directly behind the selected car, but may instead be off to one side or the other of the heading vector.

Choosing a view within the cockpit of a designated car sets a target position 20 feet in front of the driver's car, an eye position within the driver's car, and an up vector generally perpendicular to the track at an X-Y position of the designated driver's car. The target position 20 feet in front of the driver's car may be calculated using the car's heading contained in the pose matrix for the car. The target position may be greater than or lesser than 20 feet in alternative embodiments. Similarly, the target position need not be directly in front of the selected car, but may instead be off to one side or the other of the heading vector.

The present invention may include less camera perspectives than those shown in camera perspective window 174 described above. It is also understood other or additional camera perspectives may be provided in further embodiments of the present invention. For example, one or more fixed camera perspectives around the track may be defined. Moreover, the user may be given the option to define target positions, eye positions and up vectors to achieve any user defined viewing perspective of the race.

In the example of FIG. 10, the user has selected a view from behind Mark Martin's car. Upon selection of such a camera perspective, an image may be rendered as described above in rendering window 172 and as shown in FIG. 11. As discussed above, the virtual image shown in FIG. 11 includes a rendering of the sky and track from the data initially downloaded upon downloading the applet from web server 130. The window 172 further includes a virtual rendering of the cars in the race that are visible within the selected field of view, based on the wireframe and texture data initially downloaded from web server 130, and the streaming data indicating the real time positions of the cars in the race. The perspective selected in FIG. 11 by the user was that from behind Mark Martin's car number 6 (the actual perspective shown in FIG. 11 is from behind and slightly to the side of Mark Martin's car). Accordingly, the rendering shows Mark Martin's car number 6 as well as other cars within the field of view from the selected camera perspective. The positions of the cars shown on 3-D virtual rendering window 172 are the actual positions of the cars in the actual race (with a lag of 2-5 seconds in embodiments), with any positioning errors minimized and any non-existent overlap of cars corrected.

FIG. 11 also shows a graphic identifying the car selected for viewing, as well as some information about the car. The generation of such a graphic on the rendered display is known and is disclosed for example in U.S. Pat. No. 6,597,406, entitled, "System For Enhancing A Video Presentation Of A Live Event," which patent is assigned to the owner of the present invention and which patent is incorporated by reference herein in its entirety. It is understood that other cars within the field of view may include a similar graphic.

During a race, the user may elect to change the camera perspective to any of the camera perspectives offered within window 174. In embodiments, upon a change of perspective, instead of jumping to the new camera perspective, the present invention "flies" from the old perspective gradually and smoothly to the new perspective to provide a smooth transition between the old and updated viewing perspectives. While a variety of possible methods may be provided to accomplish the smooth transition between the prior and updated camera perspectives, one method is described with respect to the flowchart of FIG. 12.

The applet may control the transition from a prior perspective to the updated perspective. In step 320, the applet checks whether an updated camera perspective is received from the user. The applet continues to check until an updated camera perspective is received. At that point, the applet calculates a vector between the prior target position and the updated target position in a step 322. The applet also calculates a vector between the prior eye position and the updated eye position in step 324. In step 330, the applet defines N number of spaced points along the calculated target vector and calculated eye vector. In embodiments, N may be equal to the rate (in times per second) at which data is rendered in rendering window 172, multiplied by a predefined length of time that the transition is to take. For example, if the data is rendered 60 times per second and a flying time between the prior and updated viewing perspectives is predefined as three seconds, then N will be equal to 180 spaced points along the calculated target and eye vectors.

In step 332, the applet may calculate N number of vectors transitioning continuously between the prior up vector and the updated up vector used for the prior and updated viewing perspectives. Starting from the prior camera perspective, the applet chooses the next successive points along the calculated target and eye vectors as target and eye positions, respectively, for the camera perspective in 334. The applet also chooses the next successive up vector in the transition between the prior up vector and the updated up vector as the up vector for the camera perspective in step 336. In step 340, the virtual image of the event is rendered within rendering window 172 using the then current target and eye points and up vector for the camera perspective. In step 342, the applet checks whether there are additional points/vectors N remaining. If yes, the applet loops back to step 334 and renders the virtual image using the next successive target and eye points and up vector.

This loop continues until in step 342 there are no further additional points or vectors N. At that point in step 344 the image is rendered from the updated camera perspective. Those who are skilled in the art will appreciate various changes may be made to the steps described above in FIG. 12 in accordance with the present invention. For example, the above described steps provide a constant change of view from the prior to updated perspective over time. It is contemplated that the view may be changed more slowly or quickly at the beginning of the transition than in the end of the transition.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method of filtering data taken from a sporting event, the data indicating a position of a moving object, the method comprising the steps of:
   (a) generating a position of the moving object by obtaining a first estimate of the data indicating a position of the moving object by measuring a position of the moving object;
   (b) obtaining a first prediction of the precision of the first estimate;
   (c) obtaining a second estimate of the data indicating a position of the moving object by extrapolating a position of the moving object based on one or more prior positions of the object;
   (d) obtaining a second prediction of the precision of the second estimate;
   (e) obtaining a third estimate of the data indicating a position of the moving object using historical data indicating a reference line representing an estimate of a path traveled by object at an earlier time;
   (f) obtaining a third prediction of the precision of the third estimate;
   (g) obtaining a fourth estimate of the data indicating a position of the object based on the first, second and third estimates and the first, second and third predictions; and
   (h) transforming the first position of the moving object generated in said step (a) based on the estimates and precision of the estimates obtained in said steps (b) through (g).

2. A method as recited in claim 1, further comprising the step (i) of rendering a computer-generated image of the moving object based on graphics data for the moving object and a position of the object indicated by data adjusted in said step (g).

3. A method as recited in claim 1, further comprising the steps:
   (j) determining whether the data indicates the moving object occupies at least partially the same space as another object from the event;
   (k) adjusting the data for the moving object to move the moving object out of the same space occupied by the other object in the event it is determined in said step (j) that the data indicates the first object at least partially occupies the same space as the other object.

4. A method as recited in claim 3, wherein the sporting event is an automobile race and the moving object is a first car.

5. A method as recited in claim 4, wherein said step (k) comprises the step of adjusting the data of the first car to move the first car transversely across the race track away from the other object.

6. A method as recited in claim 4, wherein said step (k) comprises the step of adjusting the data of the first car to move the first car longitudinally along the race track away from the other object.

7. A method as recited in claim 4, wherein the other object is a second car, said step (k) comprises the step of adjusting the data of the first car to move the first car away from the second car without changing an order of the first and second cars in the race.

8. A method as recited in claim 4, wherein the other object comprises a wall, said step (k) comprises the step of adjusting the data of the first car to move the first car away from the wall.

9. A method as recited in claim 4, wherein the other object comprises a second car, the method further comprising the steps of:
   (l) generating data relating to the positions of the first and second cars prior to said step (j);
   (m) generating predictions as to the precision of the data generated in said step (l) for the first and second cars.

10. A method as recited in claim 9, wherein said step (k) comprises adjusting the data relating to the position of the first and second cars to move each car a distance based on the predictions generated in said step (m).

11. A method as recited in claim 9, wherein said step (k) comprises adjusting the data relating to the position of the first and second cars to move each car a distance proportional to a ratio of the predictions generated in said step (m).

12. A method as recited in claim 9, wherein said step (j) comprises the step of receiving GPS measurements of the position of the first and second cars.

13. A method as recited in claim 1, said step (g) comprising obtaining the fourth estimate using a least squares estimation filter.

14. A method as recited in claim 1, said step (g) comprising obtaining the fourth estimate using a Kalman filter.

15. A method as recited in claim 1, wherein said step (a) comprises the step of receiving measurements from at least one of GPS, the Galileo positioning system, the GLONASS positioning system, a ground-based RF system, an optical tracking position determination system and a track modeling system.

16. A method as recited in claim 1, wherein said step (a) comprises the step of receiving an indication of the movement of the moving object from inertia measurement units within the first and second cars.

* * * * *